United States Patent
Youn et al.

(10) Patent No.: US 12,218,985 B2
(45) Date of Patent: Feb. 4, 2025

(54) METHOD FOR MOVING IMS VOICE SESSION ON NON-3GPP TO 3GPP ACCESS

(71) Applicant: LG ELECTRONICS INC., Seoul (KR)

(72) Inventors: Myungjune Youn, Seoul (KR); Sehee Lee, Seoul (KR); Sungduck Chun, Seoul (KR); Hyunsook Kim, Seoul (KR); Laeyoung Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 389 days.

(21) Appl. No.: 17/753,378

(22) PCT Filed: Sep. 8, 2020

(86) PCT No.: PCT/KR2020/012081
§ 371 (c)(1),
(2) Date: Mar. 1, 2022

(87) PCT Pub. No.: WO2021/049841
PCT Pub. Date: Mar. 18, 2021

(65) Prior Publication Data
US 2022/0345949 A1 Oct. 27, 2022

(30) Foreign Application Priority Data

Sep. 9, 2019 (KR) .................. 10-2019-0111686
Sep. 19, 2019 (KR) .................. 10-2019-0115632
(Continued)

(51) Int. Cl.
*H04W 36/00* (2009.01)
*H04L 65/1016* (2022.01)
(Continued)

(52) U.S. Cl.
CPC ...... *H04L 65/1016* (2013.01); *H04L 65/1069* (2013.01); *H04W 36/00226* (2023.05);
(Continued)

(58) Field of Classification Search
CPC ..... H04W 36/00; H04W 36/14; H04W 36/34; H04W 36/18; H04W 36/06; H04W 8/02;
(Continued)

(56) References Cited

U.S. PATENT DOCUMENTS 11,974,218 B2 * 4/2024 Cuevas Ramirez .. H04W 48/18
2010/0329243 A1 * 12/2010 Buckley et al. ............... 370/352
(Continued)

FOREIGN PATENT DOCUMENTS

CN 107864461 3/2018
CN 109155949 1/2019
(Continued)

OTHER PUBLICATIONS

CN 109257779 A) >>> first access network device sending third session management information to the session management network element, establishing the user plane tunnel the third session management information comprises voice service of the rejected information (see Description, first paragraph). (Year: 2019).*

(Continued)

*Primary Examiner* — Meless N Zewdu
(74) *Attorney, Agent, or Firm* — LEE, HONG, DEGERMAN, KANG & WAIMEY

(57) ABSTRACT

Provided in one embodiment of the present specification is a method for user equipment (UE) for an Internet protocol multimedia subsystem (IMS) voice session. The method can comprise the steps of: establishing an EMS voice session by using a non 3GPP interworking function (N3IWF) or an enhanced packet data gateway (ePDG) through non-$3^{rd}$ generation partnership project (3GPP) access; determining (Continued)

that voice is not supported on a current NG-RAN on the basis of that the UE must moves the IMS voice session to a 3GPP access; and handing over a protocol data unit (PDU) session for the IMS voice session of the non-3GPP access to an evolved packet core (EPC) of the 3GPP access on the basis of the determination.

10 Claims, 29 Drawing Sheets

(30) Foreign Application Priority Data

Oct. 15, 2019 (KR) .................. 10-2019-0127408
Nov. 1, 2019 (KR) .................. 10-2019-0138390

(51) Int. Cl.
  *H04L 65/1069* (2022.01)
  *H04W 36/32* (2009.01)
  *H04W 36/14* (2009.01)
(52) U.S. Cl.
  CPC .... *H04W 36/322* (2023.05); *H04W 36/00695* (2023.05); *H04W 36/144* (2023.05)
(58) Field of Classification Search
  CPC . H04W 92/02; H04W 12/72; H04W 36/0011; H04W 36/0022; H04W 36/0066; H04W 60/00; H04W 60/06; H04W 36/00725; H04W 36/0077; H04W 36/0079; H04W 36/0083; H04W 36/00838; H04W 36/037; H04W 36/087; H04W 36/13; H04W 36/305; H04W 36/32; H04W 36/362; H04W 88/00; H04W 88/02; H04W 88/08; H04W 52/40; H04W 28/0226; H04W 4/02; H04W 48/04; H04W 48/20; H04W 36/0027; H04W 36/00222; H04W 36/0019; H04W 36/224; H04W 36/144; H04W 36/00226; H04W 36/00695; H04W 36/00698; H04W 36/322; H04L 65/1016; H04L 65/106; H04L 65/1096; H04L 65/1066; H04L 67/148; H04L 65/1073; H04L 65/1095; H04L 65/80; H04L 65/1069
  See application file for complete search history.

(56) References Cited

U.S. PATENT DOCUMENTS

| | | | |
|---|---|---|---|
| 2013/0324125 A1* | 12/2013 | Bachmann et al. | .. H04W 36/14 |
| 2015/0350983 A1 | 12/2015 | Kwok et al. | |
| 2018/0352483 A1 | 12/2018 | Youn et al. | |
| 2018/0359663 A1 | 12/2018 | Kim et al. | |
| 2019/0007500 A1* | 1/2019 | Kim et al. | ............ H04L 67/141 |
| 2019/0058741 A1 | 2/2019 | Mufti et al. | |
| 2019/0335534 A1* | 10/2019 | Atarius et al. | ........ H04W 80/10 |
| 2020/0275259 A1* | 8/2020 | Zhu et al. | ............... H04W 8/24 |
| 2020/0314702 A1* | 10/2020 | Rahman | ............ H04W 36/0022 |
| 2020/0336953 A1* | 10/2020 | Liu et al. | .......... H04W 36/0055 |

FOREIGN PATENT DOCUMENTS

| | | | | |
|---|---|---|---|---|
| KR | 2015-0079927 | | 7/2015 | |
| WO | WO 2012040251 A1 * | | 3/2012 | ............ H04W 36/12 |
| WO | WO 2012040251 A2 * | | 3/2012 | ............ H04W 36/12 |
| WO | 2018231813 | | 12/2018 | |
| WO | WO 2020049347 A1 * | | 3/2020 | ............ H04W 36/00 |

OTHER PUBLICATIONS

KR 20190004217 A) >>> Method for PDU Session Anchor Relocation and 5G Network Registration (see title) (Year: 2019).*
PCT International Application No. PCT/KR2020/012081, International Search Report dated Dec. 3, 2020, 5 pages.
3rd Generation Partnership Project, "Technical Specification Group Services and System Aspects; System Architecture for the 5G System; Stage 2 (Release 16)," 3GPP TS 23.501 V16.1.0, Jun. 2019, 369 pages.
3rd Generation Partnership Project, "Technical Specification Group Services and System Aspects; Procedures for the 5G System; Stage 2 (Release 16)," 3GPP TS 23.502 V16.1.1, Jun. 2019, 496 pages.
The State Intellectual Property Office of the People's Republic of China Application Serial No. 202080073682.2, Office Action dated Sep. 8, 2023, 6 pages.
Nokia et al., "Voice fallback during roaming scenarios," 3GPP TSG-SA2 Meeting #127, S2-183253, Apr. 2018, 4 pages.
Huawei, "Support of EPS fallback for IMS Voice," 3GPP TSG-RAN WG3#99, R2-180818, Feb.-Mar. 2018, 6 pages.
The State Intellectual Property Office of the People's Republic of China Application Serial No. 202080073682.2, Office Action dated Mar. 30, 2023, 8 pages.
European Patent Office Application Serial No. 20864188.6, Search Report dated Aug. 2, 2022, 14 pages.
3rd Generation Partnership Project, "Technical Specification Group Services and System Aspects; System Architecture for the 5G System; Stage 2 (Release 16)," 3GPP TS 23.501 V16.2.0, Sep. 2019, 392 pages.
Telecom Italia et al., "Alignment of IMS Voice Service via EPS Fallback with RAN specifications," S2-1906390, SA WG2 Meeting #133, May 2019, 5 pages.

* cited by examiner

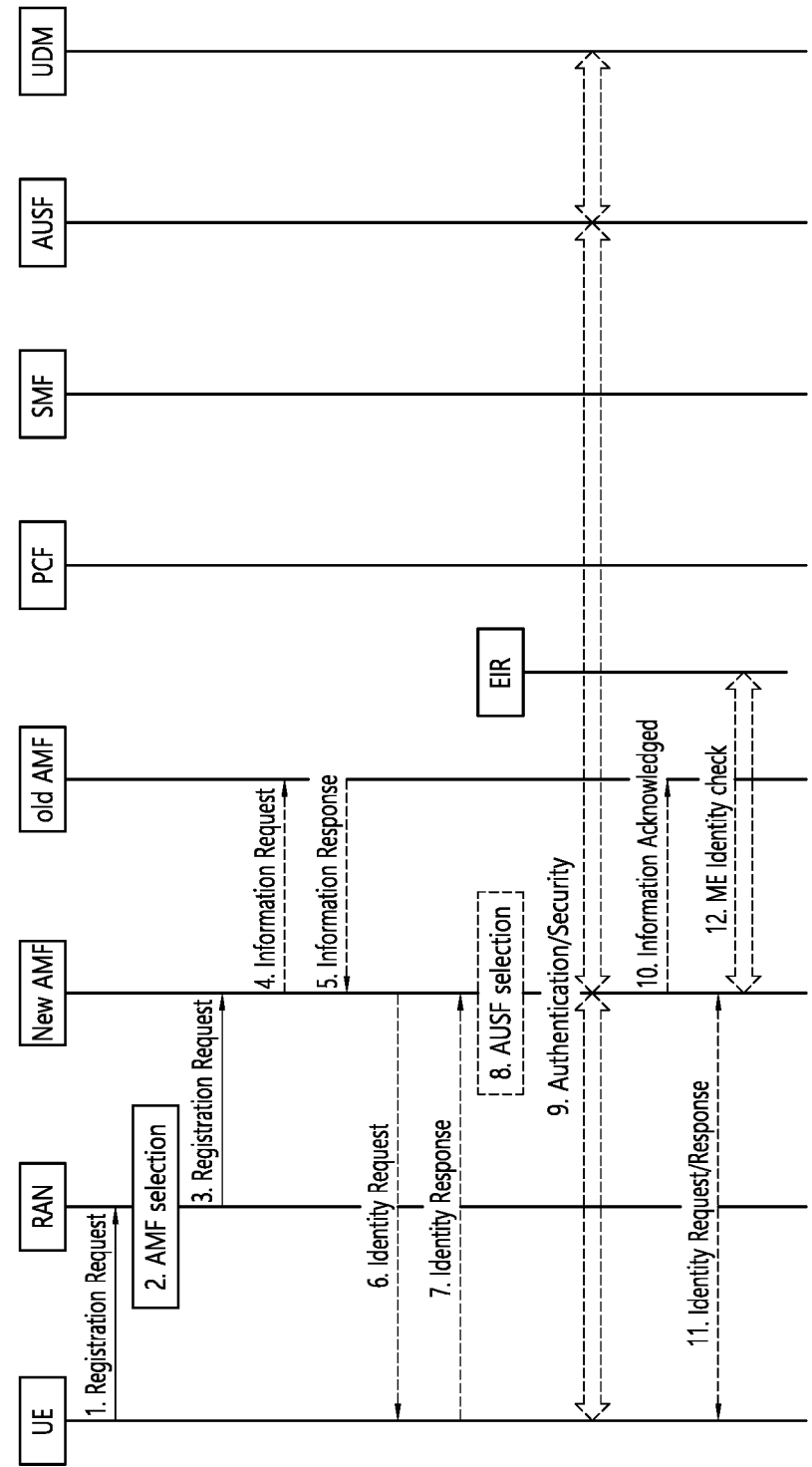

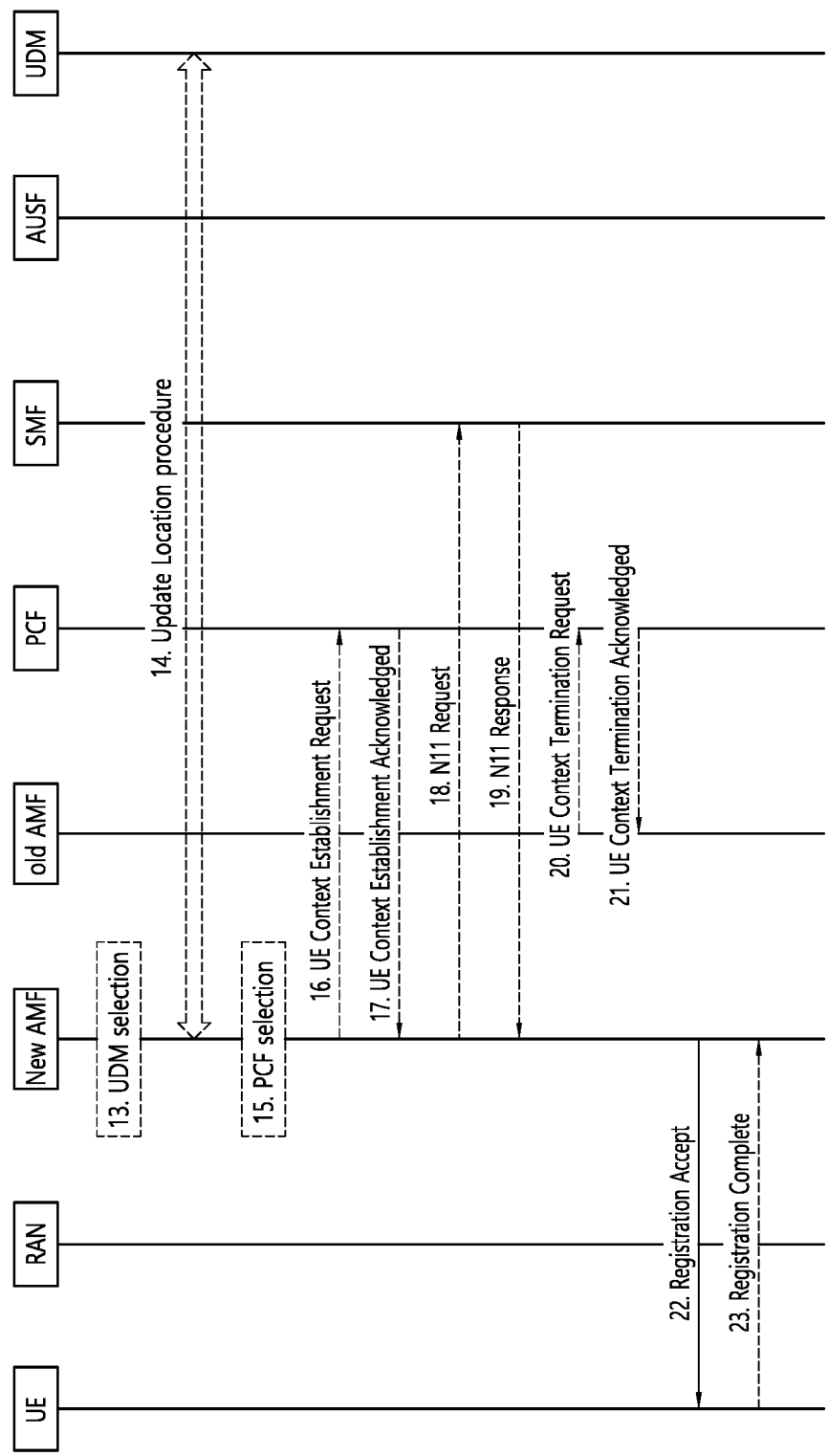

METHOD FOR MOVING IMS VOICE SESSION ON NON-3GPP TO 3GPP ACCESS

CROSS-REFERENCE TO RELATED APPLICATIONS

This application is the National Stage filing under 35 U.S.C. 371 of International Application No. PCT/KR2020/012081, filed on Sep. 8, 2020, which claims the benefit of earlier filing date and right of priority to Korean Application Nos. 10-2019-0111686 filed on Sep. 9, 2019, 10-2019-0115632 filed on Sep. 19, 2019, 10-2019-0127408 filed on Oct. 15, 2019, and 10-2019-0138390 filed on Nov. 1, 2019, the contents of all of which are hereby incorporated by reference herein in their entireties.

TECHNICAL FIELD

The present specification relates to mobile communications.

BACKGROUND

FIG. 1 shows a structure of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (Evolved Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM)/Enhanced Data rates for Global Evolution (EDGE) Radio Access Network (GERAN)).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an untrusted network, such as an Interworking Wireless Local Area Network (I-WLAN), a trusted network, such as a Code Division Multiple Access (CDMA)).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a UE to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2*a* and S2*b* correspond to non-3GPP interfaces. S2*a* is a reference point that provides related control and mobility support between trusted non-3GPP access and PDN GWs to the user plane. S2*b* is a reference point that provides related control and mobility support between ePDG and P-GW to the user plane.

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 3 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 2 is a structural diagram of a next-generation mobile communication network.

The 5G Core network (5GC) may include various components, part of which are shown in FIG. 2, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN), i.e., gNB or base station.

The UE 10 may be provided with a data service even through untrusted non-3GPP access, e.g., a Wireless Local Area Network (WLAN). In order to connect the non-3GPP access to a core network, the N3IWF 59 may be deployed.

FIG. 3 is an exemplary diagram illustrating a predicted structure of a next generation mobile communication in terms of a node.

Referring to FIG. 3, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 3, a UE can simultaneously access two data networks using multiple Protocol Data Unit (PDU) sessions.

FIG. 4 is an exemplary diagram illustrating an architecture for supporting simultaneously access two data networks.

FIG. 4 illustrates an architecture that allows the UE to simultaneously access two data networks using one PDU session.

Reference points shown in FIGS. 3 and 4 are as follows.

N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS Entity for MM Provides the Following Functions in General.
  NAS procedures related to AMF include the following.
  Registration management and access management procedures. AMF supports the following functions.
  Secure NAS signal connection between UE and AMF (integrity protection, encryption)
2) The NAS Entity for SM Performs Session Management Between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

On the other hand, even if the UE goes out of Wi-Fi coverage while using Voice over Wi-Fi (VoWiFi), a Wi-Fi call needs to be handed over to 3GPP access in order to be able to provide a voice service without interruption.

However, there was a problem that a technical method for handover of a Wi-Fi call to 3GPP access was not presented yet.

SUMMARY

Accordingly, an object of the present specification is to propose a method for solving the above-described problems.

In order to solve the above-described problems, a disclosure of the present specification provides a method of a User Equipment (UE) for an Internet protocol Multimedia Subsystem (IMS) voice session. The method may include establishing an IMS voice session via a non-3rd Generation Partnership Project (3GPP) access using a Non-3GPP Inter-Working Function (N3IWF) or an enhanced Packet Data Gateway (ePDG); determining that voice is not supported over a current Next Generation Radio Access Network (NG-RAN) based on the UE moving the IMS voice session to a 3GPP access; and based on the determination, performing a handover of a Protocol Data Unit (PDU) session for the IMS voice session of the non-3GPP access to an Evolved Packet Core (EPC) of the 3GPP access.

In order to solve the above-described problems, a disclosure of the present specification also provides a method of a base station for an Internet protocol Multimedia Subsystem (IMS) voice session. The method may include receiving a Protocol Data Unit (PDU) session establishment request message including Quality of Service (QoS) flow setup for an IMS voice session from a Session Management Function (SMF). The method may include transmitting a PDU session resource setup response message including information related to the fallback of an IMS voice to the SMF through an Access and mobility Management Function (AMF) based on the base station not supporting the IMS voice. The PDU session resource setup response message may include cause information indicating IMS voice Evolved Packet System (EPS) fallback triggered or Radio Access Technology (RAT)

fallback triggered. The method may include performing an EPS fallback procedure or an inter-RAT fallback procedure.

In order to solve the above-described problems, a disclosure of the present specification provides a chipset mounted on a User Equipment (UE). The chipset may include at least one processor; and at least one memory for storing instructions and operably electrically connectable to the at least one processor. The instructions, based on being executed by the at least one processor, may perform operations comprising: establishing an IMS voice session via a non-3rd Generation Partnership Project (3GPP) access using a Non-3GPP Inter-Working Function (N3IWF) or an enhanced Packet Data Gateway (ePDG); determining that voice is not supported over a current Next Generation Radio Access Network (NG-RAN) based on the UE moving the IMS voice session to a 3GPP access; based on the determination, performing a handover of a Protocol Data Unit (PDU) session for the IMS voice session of the non-3GPP access to an Evolved Packet Core (EPC) of the 3GPP access.

In order to solve the above-described problems, a disclosure of the present specification provides a User Equipment (UE). The UE may include a transceiver; at least one processor; and at least one memory for storing instructions and operably electrically connectable to the at least one processor. The instructions, based on being executed by the at least one processor, may perform operations comprising: establishing an IMS voice session via a non-3rd Generation Partnership Project (3GPP) access using a Non-3GPP Inter-Working Function (N3IWF) or an enhanced Packet Data Gateway (ePDG); determining that voice is not supported over a current Next Generation Radio Access Network (NG-RAN) based on the UE moving the IMS voice session to a 3GPP access; based on the determination, performing a handover of a Protocol Data Unit (PDU) session for the IMS voice session of the non-3GPP access to an Evolved Packet Core (EPC) of the 3GPP access.

In order to solve the above-described problems, a disclosure of the present specification provides a non-volatile computer-readable storage medium having recorded thereon instructions. The instructions, when executed by one or more processors, may cause the one or more processors to perform operation comprising: establishing an IMS voice session via a non-3rd Generation Partnership Project (3GPP) access using a Non-3GPP InterWorking Function (N3IWF) or an enhanced Packet Data Gateway (ePDG); determining that voice is not supported over a current Next Generation Radio Access Network (NG-RAN) based on the UE moving the IMS voice session to a 3GPP access; based on the determination, performing a handover of a Protocol Data Unit (PDU) session for the IMS voice session of the non-3GPP access to an Evolved Packet Core (EPC) of the 3GPP access.

In order to solve the above-described problems, a disclosure of the present specification provides a chipset mounted on a base station. The chipset may include at least one processor; and at least one memory for storing instructions and operably electrically connectable to the at least one processor. The instructions, based on being executed by the at least one processor, may perform operations comprising: receiving a Protocol Data Unit (PDU) session establishment request message including Quality of Service (QoS) flow setup for an IMS voice session from a Session Management Function (SMF). The operations may include transmitting a PDU session resource setup response message including information related to the fallback of an IMS voice to the SMF through an Access and mobility Management Function (AMF) based on the base station not supporting the IMS voice. The PDU session resource setup response message may include cause information indicating IMS voice Evolved Packet System (EPS) fallback triggered or Radio Access Technology (RAT) fallback triggered. The operations may include performing an EPS fallback procedure or an inter-RAT fallback procedure.

According to the disclosure of the present specification, it is possible to solve the problems of the prior art.

BRIEF DESCRIPTION OF THE DRAWINGS

FIGS. 6a and 6b are a signal flowchart illustrating an exemplary registration procedure.

DETAILED DESCRIPTION

Figure 1:
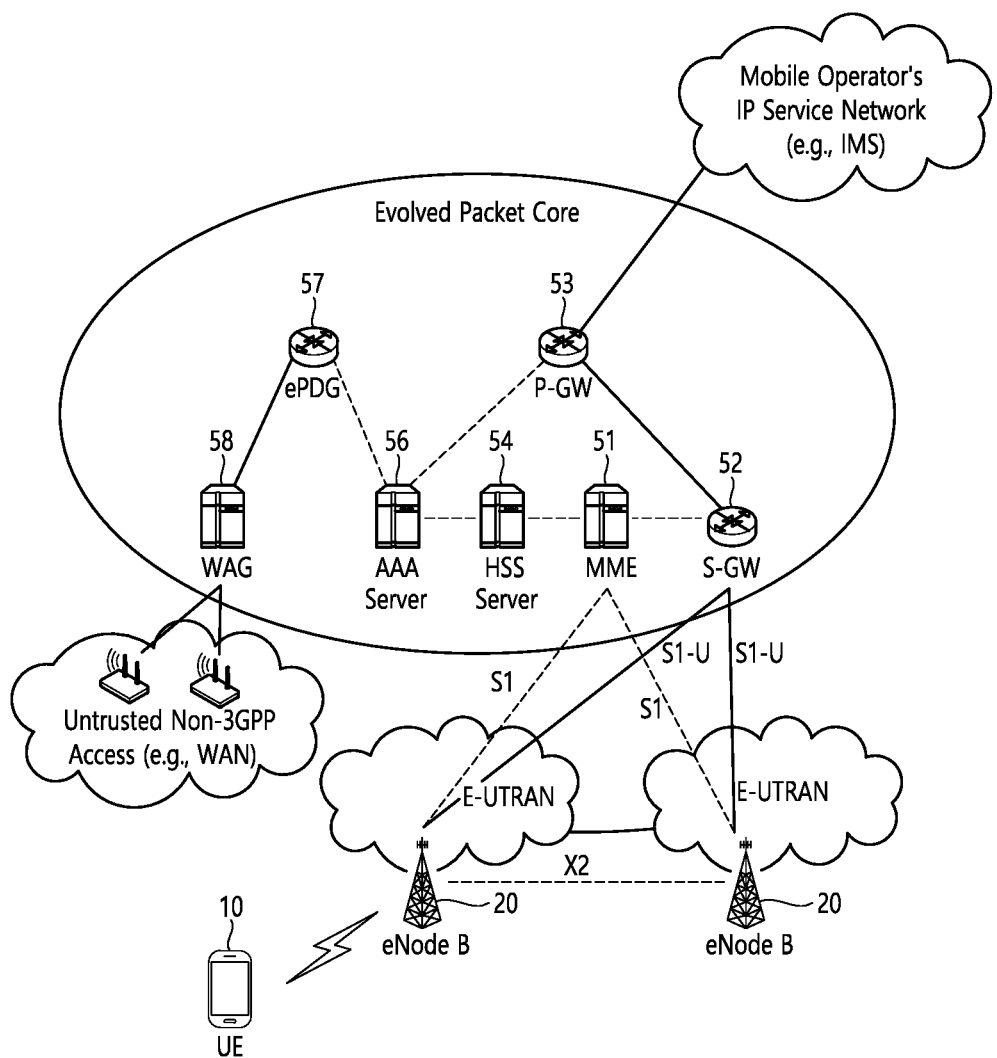
FIG. 1 shows a structure of an evolved mobile communication network.
Figure 2:
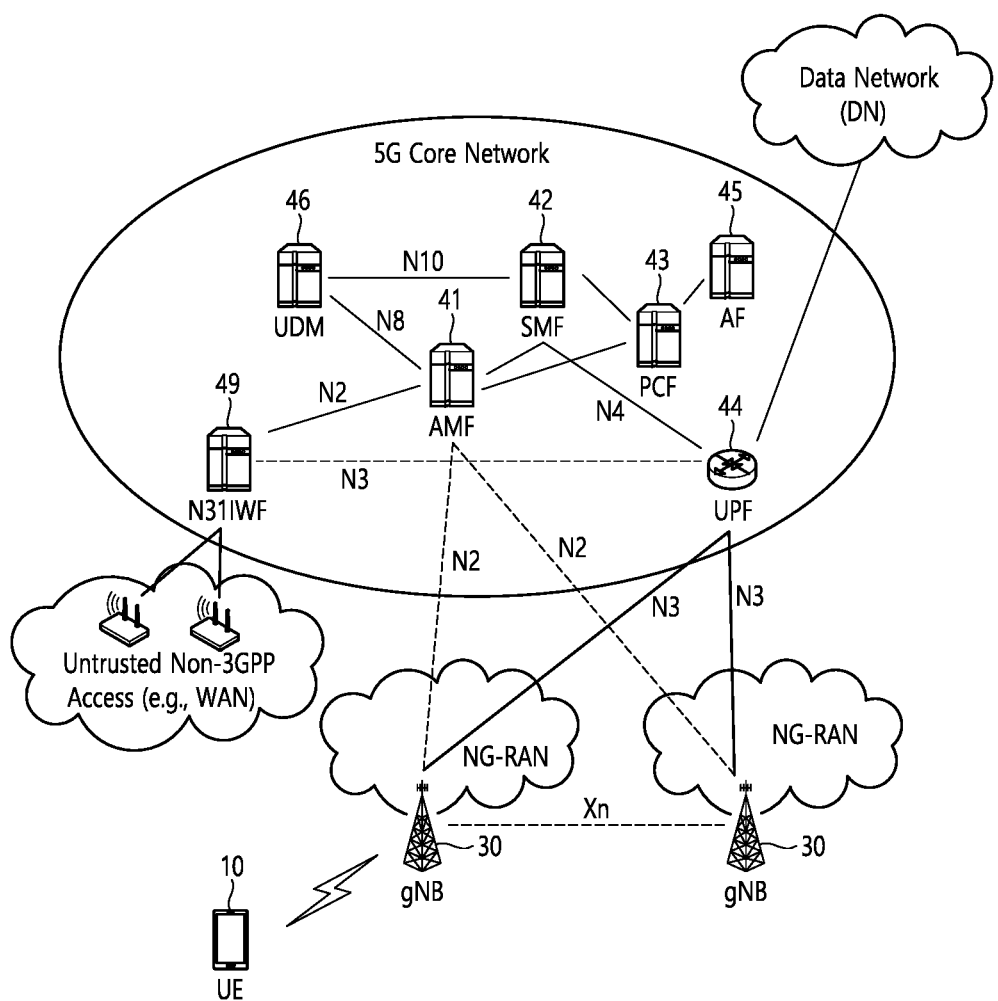
FIG. 2 is a structural diagram of a next-generation mobile communication network.
Figure 3:
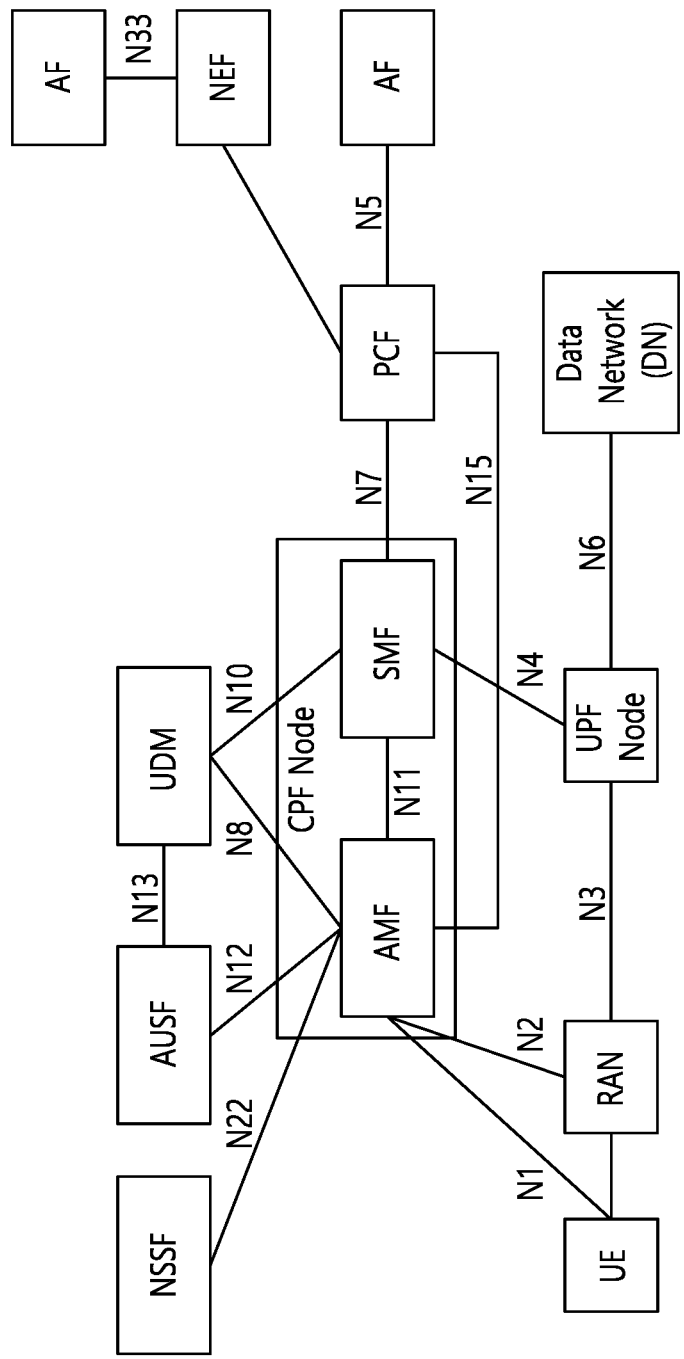
FIG. 3 is an exemplary diagram illustrating a predicted structure of a next generation mobile communication in terms of a node.
Figure 4:
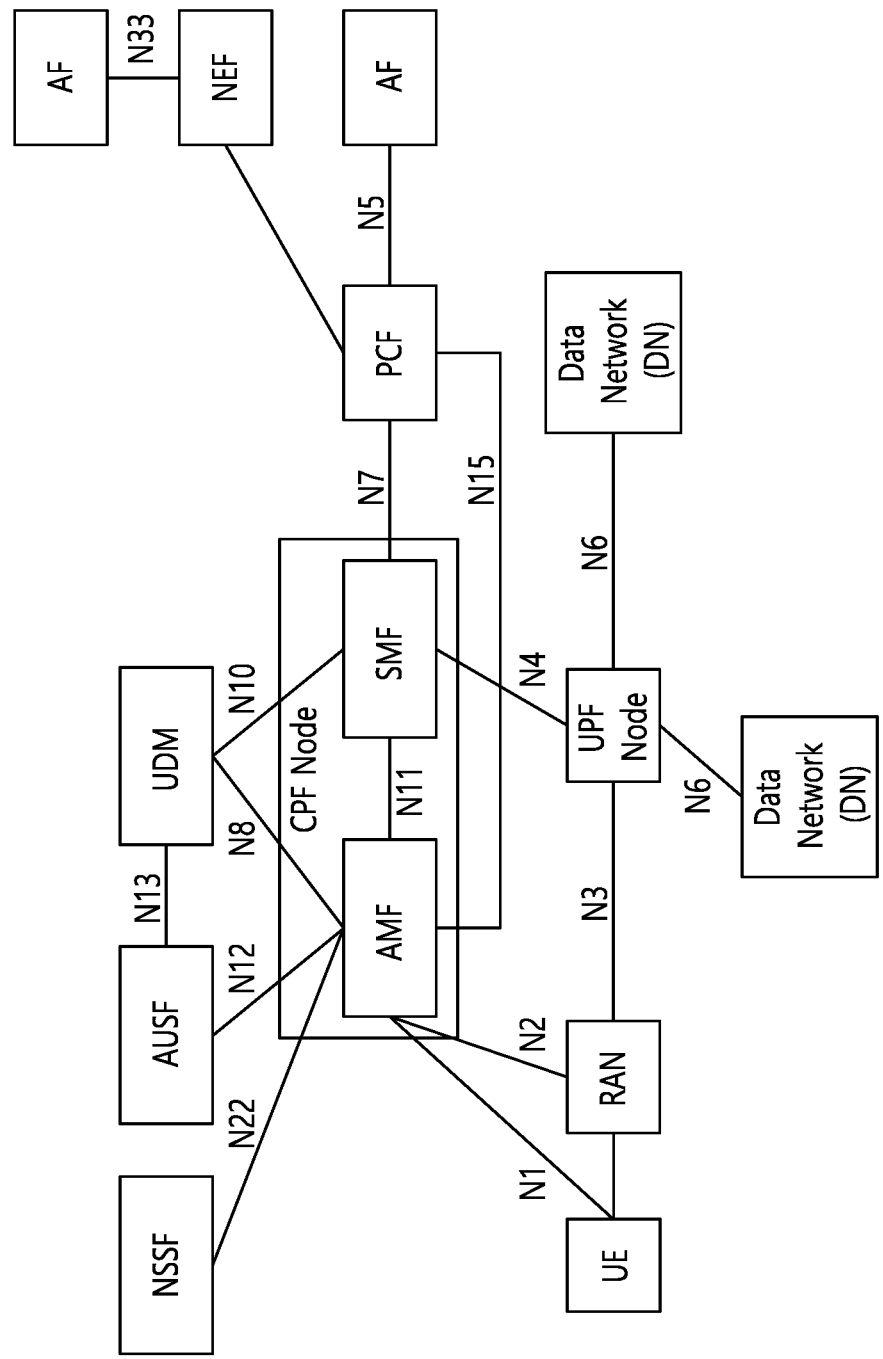
FIG. 4 is an exemplary diagram illustrating an architecture for supporting simultaneously access two data networks.
Figure 5:
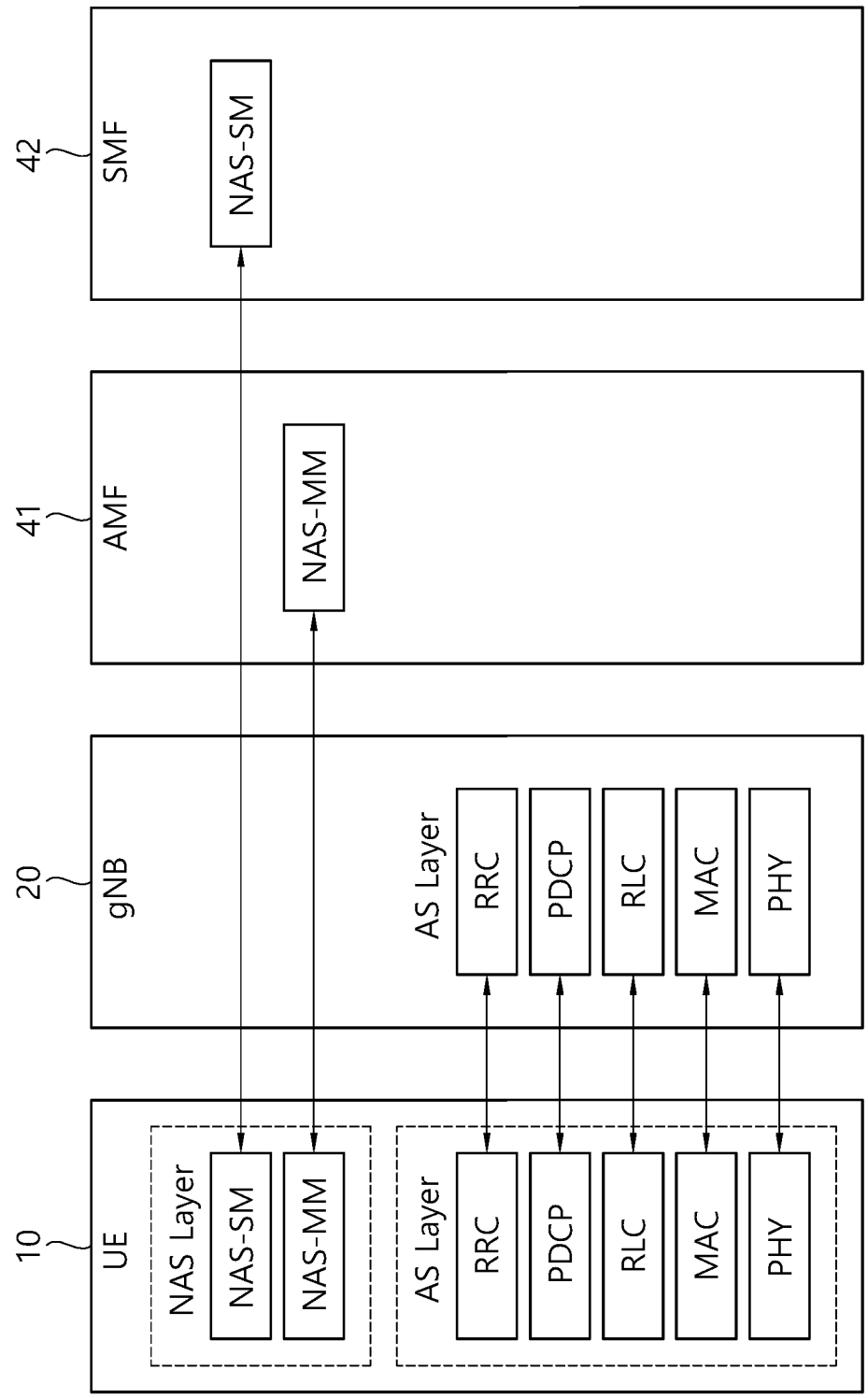
FIG. 5 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

FIGS. 6*a* and 6*b* are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Step 4 to Step 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Step 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session
  Establishment procedures may exist as described below.
  A PDU Session Establishment procedure initiated by the UE.
  A PDU Session Establishment procedure initiated by the network. For this, the network may transmit a Device Trigger message to an application (or applications) of the UE.

Figure 7A:
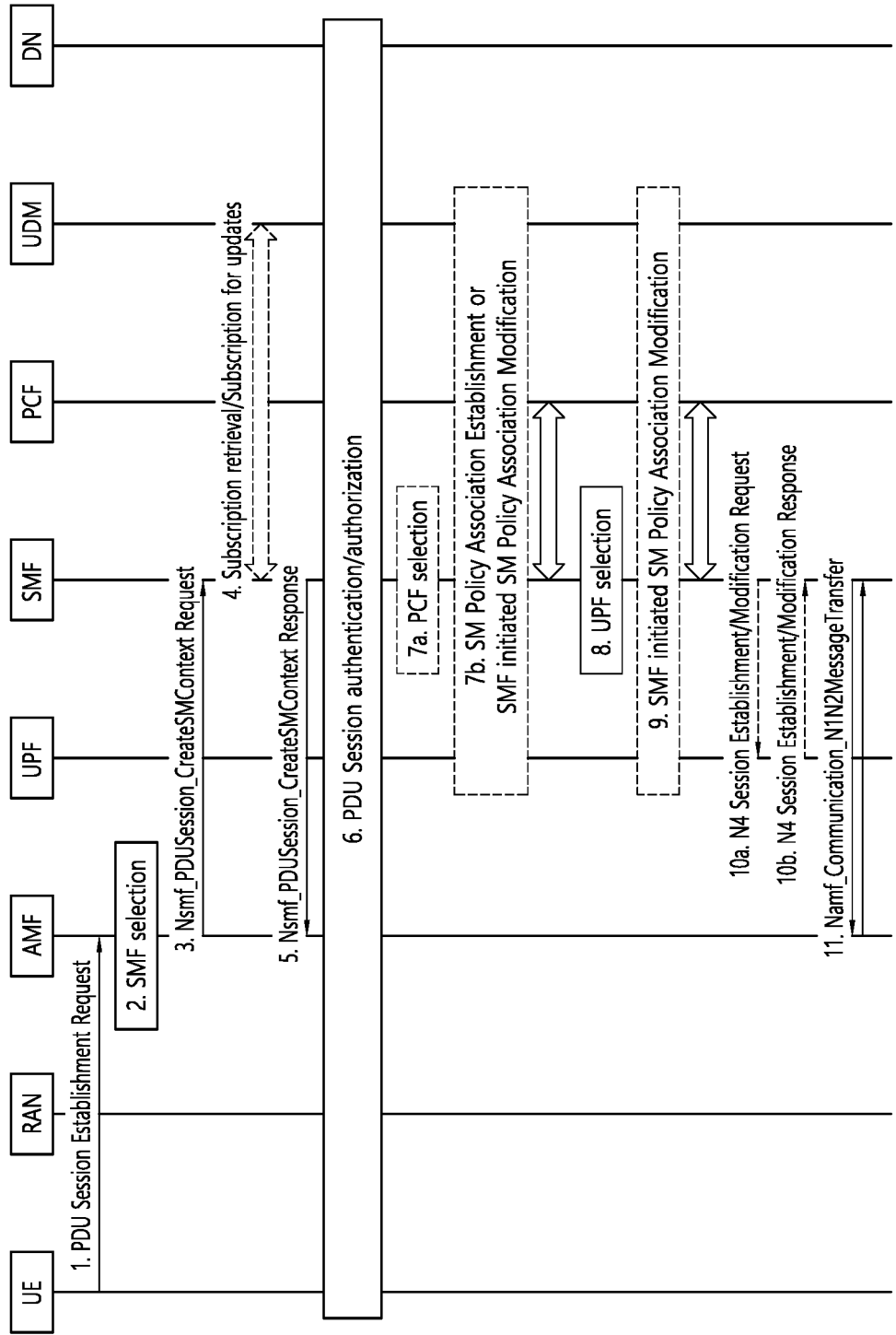
FIGS. 7a and 7b are a signal flowchart illustrating an exemplary PDU session establishment procedure.
Figure 7B:
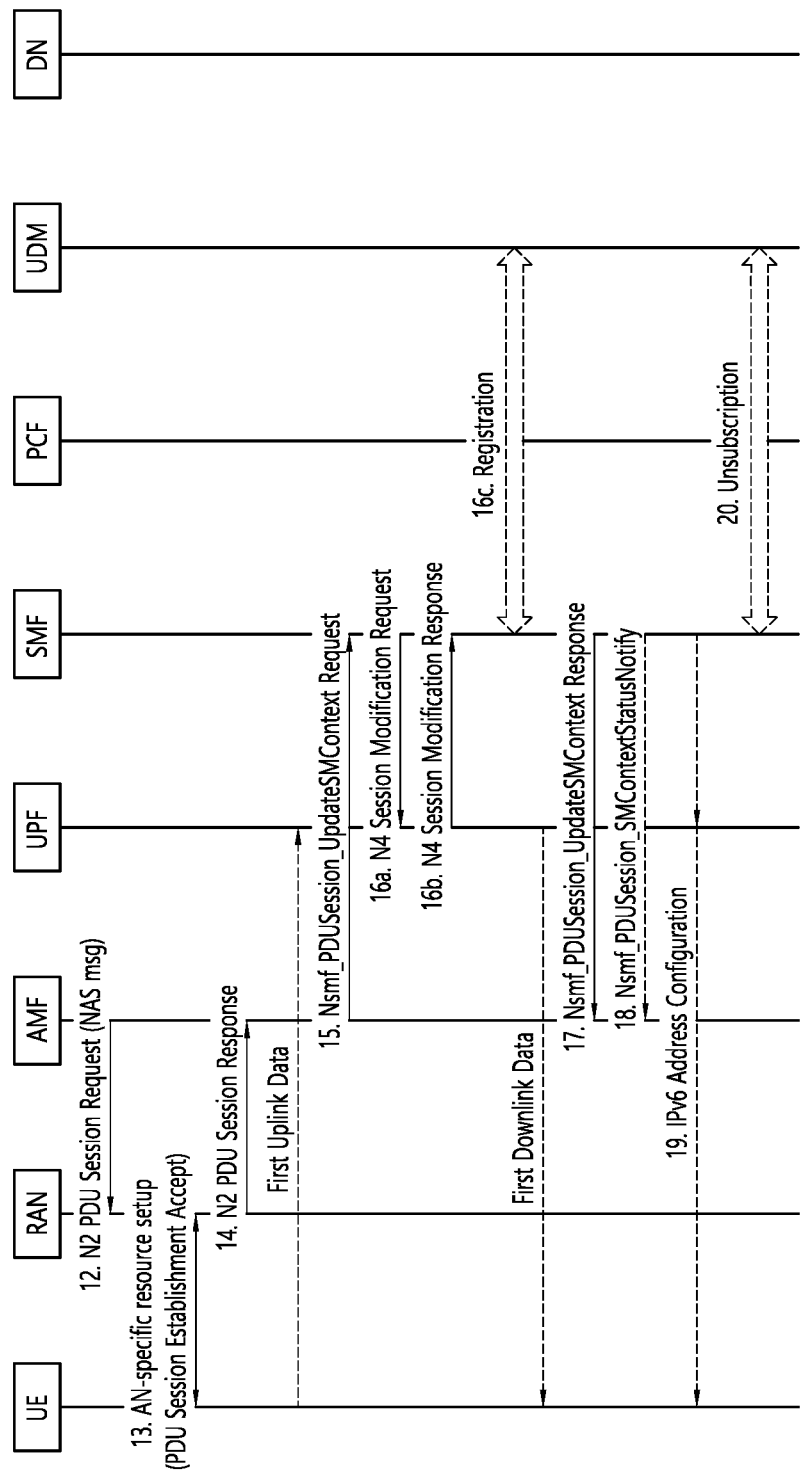

FIGS. 7a and 7b are a signal flowchart illustrating an exemplary PDU session establishment procedure.

The procedure shown in FIGS. 7a and 7b assumes that the UE has already registered on the AMF according to the registration procedure shown in FIG. 6. Therefore, it is assumed that the AMF has already acquired user subscription data from UDM.

1) The UE transmits a NAS message to the AMF. The message may include Single Network Slice Selection Assistance Information (S-NSSAI), Data network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for Home Public Land Mobile Network (HPLMN).

More specifically, the UE may extract and store the allowed NSSAI and the information on the mapped NSSAI, included in the registration accept message received from the network (i.e., AMF) in the registration procedure in FIG. 6. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SWF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSM-Context Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

During the procedure, if the PDU Session Establishment is not successful, the SMF notifies this to the AMF.

Figure 8A:
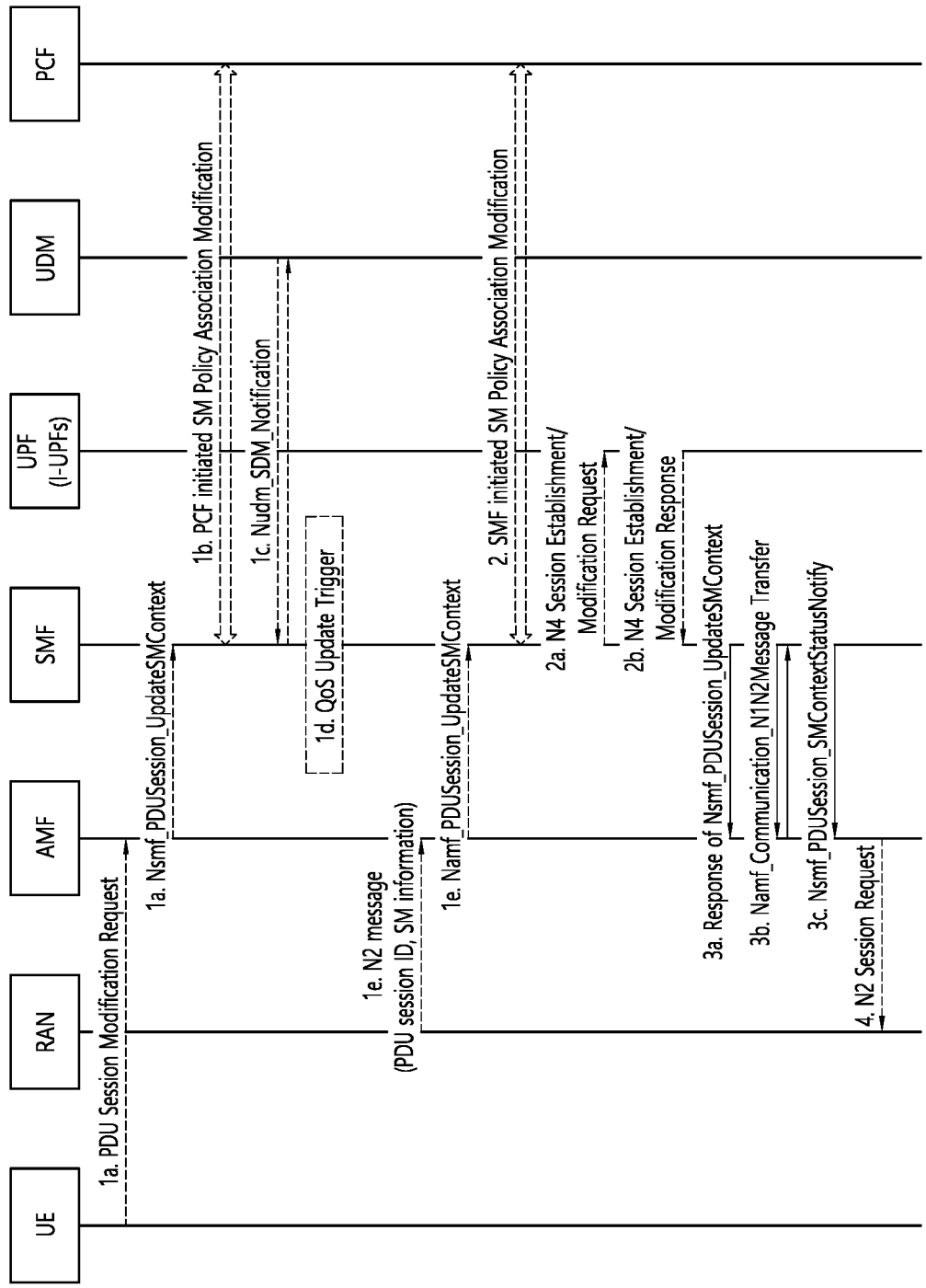
FIGS. 8a and 8b show a modification procedure for a PDU session.
Figure 8B:
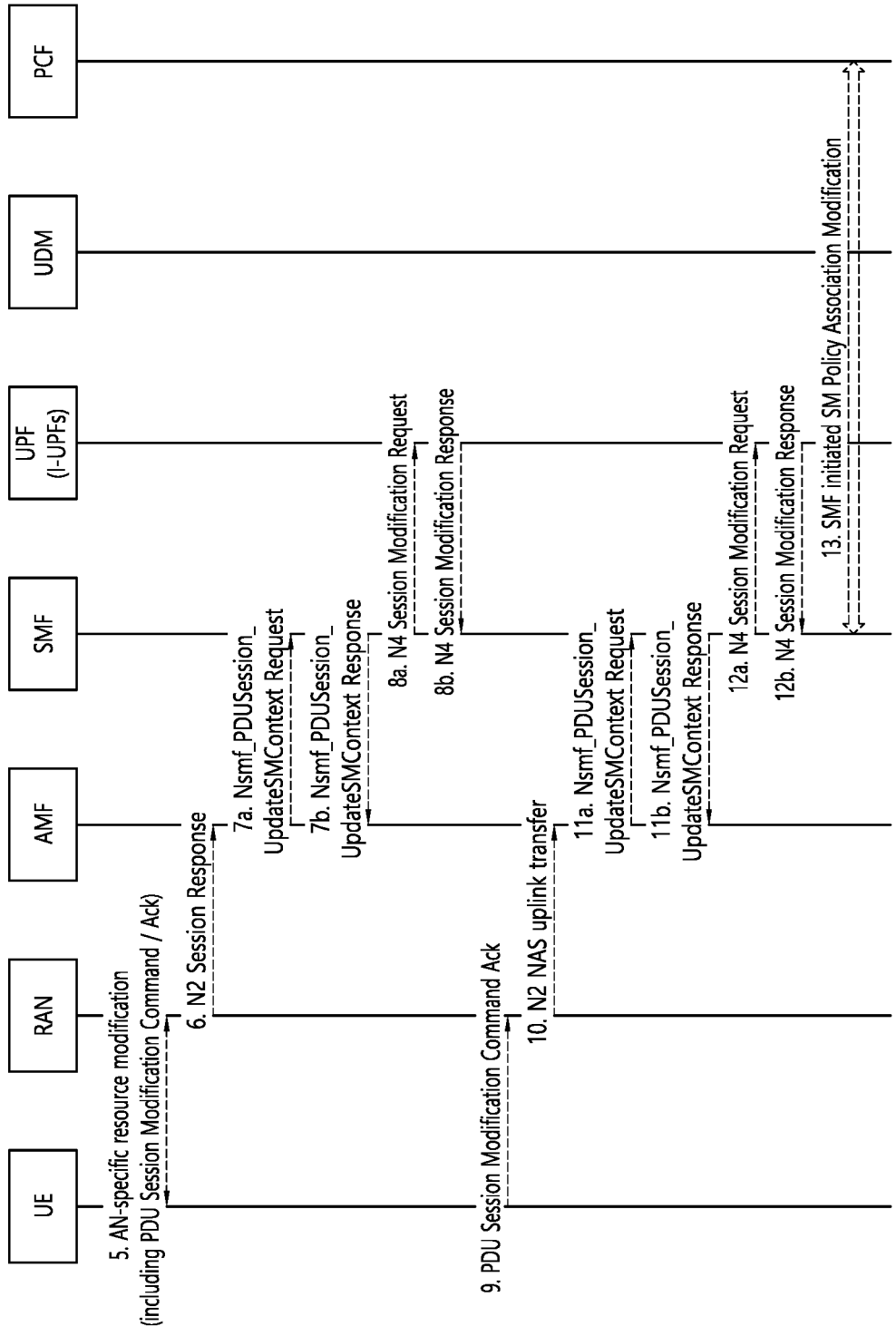

FIGS. 8a and 8b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, i.e., gNB or base station, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

<Voice Service>

When a UE registers with 5GS for a voice service in 5GS, the network notifies whether a voice service is supported to the UE through an indication, e.g., "IMS voice over PS Session Supported Indication". The indication informs whether Internet protocol Multimedia Subsystem (IMS) voice is supported in the corresponding access when the UE registers through each access (e.g., 3GPP access, non-3GPP access). In this case, the AMF may give an indication in the following cases.

The serving PLMN AMF transmits the above indication in one of the following cases:
 i) If the network and the UE are able to support IMS voice over PS session in the current registration area with a 5G QoS Flow that supports voice.
 ii) If the network or the UE are not able to support IMS voice over PS session over NR connected to 5GC, but is able for one of the following:
  If the network and the UE are able to support IMS voice over PS session over E-UTRA connected to 5GC, and the NG-RAN (i.e., gNB or base station) supports a handover or redirection to E-UTRA connected to 5GC at QoS Flow establishment for IMS voice
  If the UE supports handover to Evolved Packet System (EPS), the EPS supports IMS voice, and the NG-RAN (i.e., gNB or base station) supports a handover to EPS at QoS Flow establishment for IMS voice
  If the UE supports redirection to EPS, and the NG-RAN (i.e., gNB or base station) supports redirection to EPS at QoS Flow establishment for IMS voice
 iii) If the network is not able to provide a successful IMS voice over PS session over E-UTRA connected to 5GC, but is able for one of the following:
  If the UE supports handover to EPS, and the NG-RAN (i.e., gNB or base station) supports a handover to EPS at QoS Flow establishment for IMS voice
  If the UE supports redirection to EPS, the EPS supports IMS voice, and the NG-RAN (i.e., gNB or base station) supports redirection to EPS at QoS Flow establishment for IMS voice.

The serving PLMN may provide the indication based on, e.g., local policy, UE capabilities, HPLMN, whether IP address preservation is possible, whether NG-RAN (i.e., gNB or base station) to UTRAN Single Radio Voice Call Continuity (SRVCC) is supported, how extended NG-RAN (i.e., gNB or base station) coverage is, and the Voice Support Match Indicator from the NG-RAN (i.e., gNB or base station). The AMF in serving PLMN may indicate that IMS voice over PS is supported only if the serving PLMN has a roaming agreement that covers support of IMS voice with the HPLMN.

Although the AMF cannot directly support IMS voice in 5GS, if it can support IMS voice through an EPS fallback procedure, the AMF may inform the UE that IMS voice is supported. In addition, in case that the current cell is NR, even if IMS voice cannot be directly supported, but IMS voice can be supported through a Radio Access Technology (RAT) fallback procedure, it is possible to inform the UE that IMS voice is supported. In this case, the UE operates without distinguishing whether the voice service is serviced through 5GS or is serviced through EPS fallback/RAT fallback. If EPS fallback/RAT fallback is required, the network may perform EPS fallback/RAT fallback for the UE through the following procedure and may provide a voice service.

Figure 9:
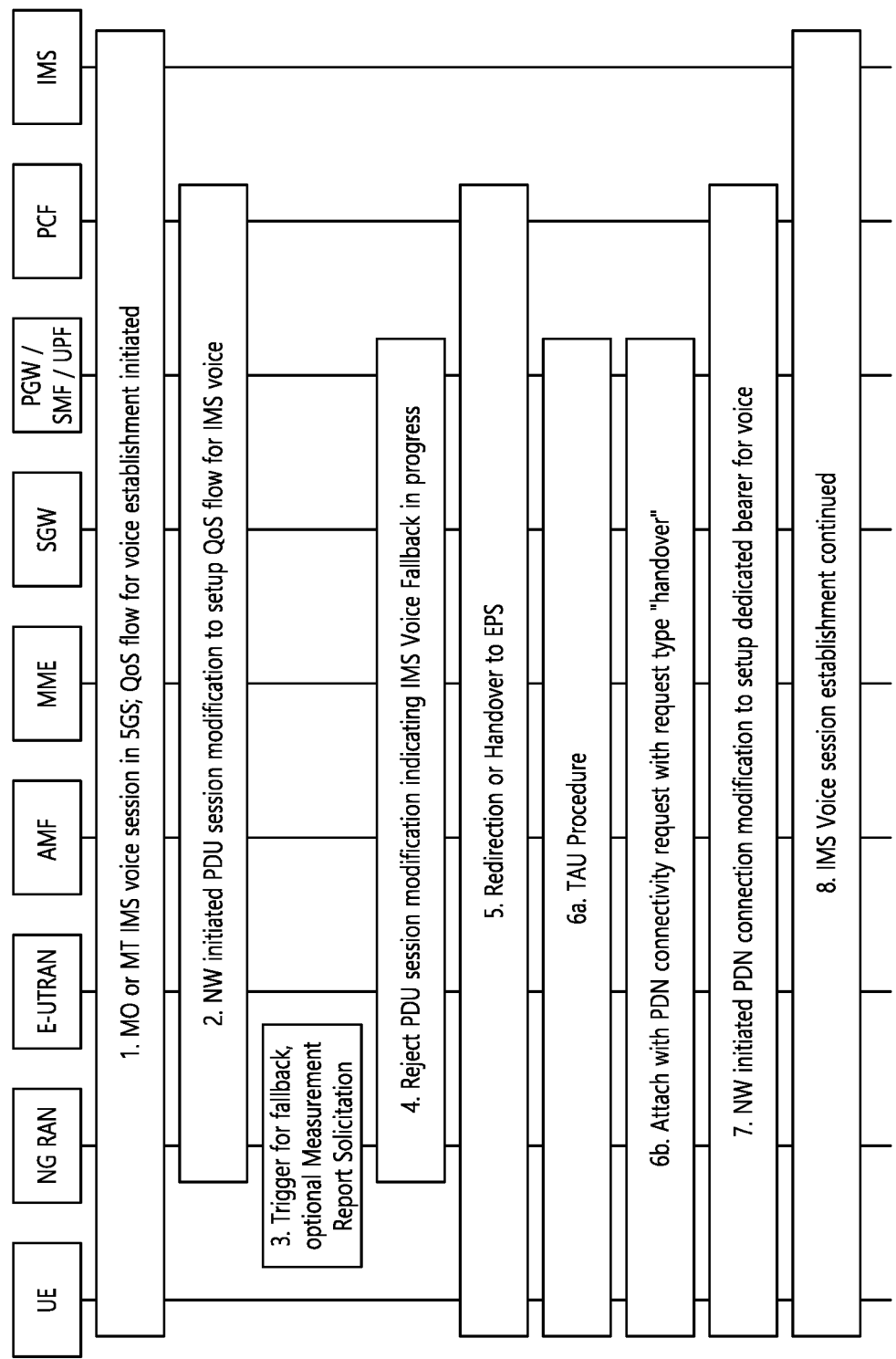
FIG. 9 is an exemplary signal flow diagram illustrating an EPS fallback procedure for IMS voice.

FIG. 9 is an exemplary signal flow diagram illustrating an EPS fallback procedure for IMS voice.

When the UE is served by the 5G System, the UE may have one or more PDU sessions each including one or more QoS flows. The serving PLMN AMF may transmit an indication towards the UE during the registration procedure that IMS voice over PS session is supported. And the UE has registered in the IMS. If N26 interface is not supported, the serving PLMN AMF transmits an indication towards the UE during the registration procedure that interworking without N26 is supported.

Step 1. UE camps on NG-RAN (i.e., gNB or base station) in the 5GS and an Mobile oriented (MO) or mobile Terminated (MT) IMS voice session establishment has been initiated.

Step 2. A message for network initiated PDU session modification procedure to setup QoS flow for voice reaches the NG-RAN (i.e., gNB or base station).

Step 3. NG-RAN (i.e., gNB or base station) is configured to support EPS fallback for IMS voice. NG-RAN decides to trigger fallback to EPS, considering UE capabilities, indication from AMF that "Redirection for EPS fallback for voice is possible", network configuration (e.g. N26 availability configuration) and radio conditions. If NG-RAN (i.e., gNB or base station) decides not to trigger fallback to EPS, then the procedure stops here.

NG-RAN (i.e., gNB or base station) may initiate measurement report solicitation including E-UTRAN as target.

Step 4. NG-RAN (i.e., gNB or base station) responds indicating rejection of the PDU session modification request message received in step 2 by transmitting PDU session response message towards the PGW-C+SMF via the AMF (or H-SMF+P-GW-C via V-SMF) with an indication that mobility due to fallback for IMS voice is ongoing. The PGW-C+SMF maintains the PCC rule(s) associated with the QoS flow(s).

Step 5. NG-RAN (i.e., gNB or base station) initiates either handover, or AN release via inter-system redirection to EPS, considering UE capabilities. The PGW-C+SMF reports change of the RAT type. When the UE is connected to EPS, either step 6a or step 6b is executed.

Step 6a. In the case of EPS handover or inter-system redirection to EPS with N26 interface, Tracking Area update (TAU) procedure is performed.

Step 6b. In the case of inter-system redirection to EPS without N26 interface, and if the UE supports Request Type flag "handover" for PDN connectivity request during the attach procedure and has received the indication that interworking without N26 is supported, then the UE transmits an attach request message with PDN connectivity request with request type "handover".

In inter-system redirection, the UE uses the emergency indication in the RRC message and E-UTRAN provides the emergency indication to MME during TAU procedure or attach procedure.

Step 7. After completion of the mobility procedure to EPS or as part of the 5GS to EPS handover procedure, the SMF/PGW re-initiates the setup of the dedicated bearer for IMS voice, mapping the 5G QoS to EPC QoS parameters. The PGW-C+SMF reports about successful resource allocation and access network information.

Step 8. The IMS voice session establishment is continued.

At least for the duration of the voice call in EPS, the E-UTRAN is configured to not trigger any handover to 5GS.

Figure 10:
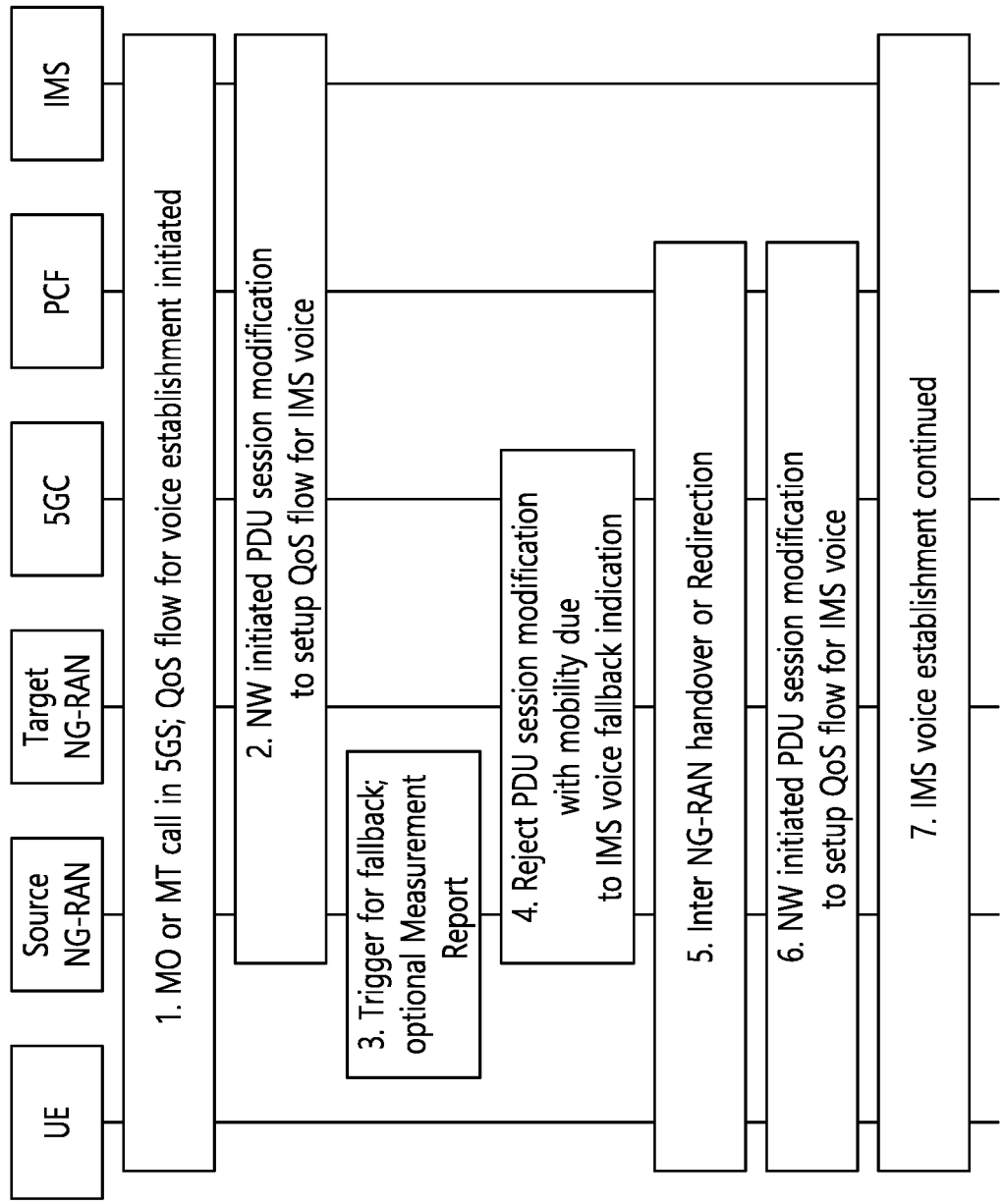
FIG. 10 is an exemplary signal flow diagram illustrating an RAT fallback procedure in 5GC for IMS voice.

FIG. 10 is an exemplary signal flow diagram illustrating an RAT fallback procedure in 5GC for IMS voice.

When the UE is served by the 5GC, the UE may have one or more PDU sessions each including one or more QoS flows. The serving PLMN AMF transmits an indication towards the UE during the registration procedure that IMS voice over PS session is supported.

Step 1. UE camps on source NG-RAN (i.e., gNB or base station) in the 5GS and an MO or MT IMS voice session establishment has been initiated.

Step 2. A message for network initiated PDU session modification procedure to setup QoS flow for voice reaches the source NG-RAN (i.e., gNB or base station).

Step 3. If source NG-RAN (i.e., gNB or base station) is configured to support RAT fallback for IMS voice, source NG-RAN decides to trigger RAT fallback, considering on UE capabilities, network configuration and radio conditions.

Source NG-RAN (i.e., gNB or base station) may initiate measurement report solicitation from the UE including target NG-RAN (i.e., gNB or base station).

Step 4. Source NG-RAN (i.e., gNB or base station) responds indicating rejection of the PDU session modification request message received in step 2 by transmitting PDU session response message towards the SMF (or V-SMF, in case of roaming scenario) via the AMF with an indication that mobility due to fallback for IMS voice is ongoing.

The SMF maintains the PCC rule(s) associated with the QoS Flow(s).

Step 5. Source NG-RAN (i.e., gNB or base station) initiates Xn based Inter NG-RAN (i.e., gNB or base station) handover or N2 based inter NG-RAN (i.e., gNB or base station) handover, or redirection to E-UTRA connected to 5GC. The SMF reports change of the RAT type.

In intra-system redirection, the UE uses the emergency indication in the RRC message and E-UTRAN provides the emergency indication to AMF during 5G registration procedure.

Step 6. After completion of the inter NG-RAN (i.e., gNB or base station) (inter-RAT) handover or redirection to E-UTRA connected to 5GC, the SMF re-initiates the PDU session modification procedure to setup QoS flow for IMS voice. The SMF reports about successful resource allocation and access network information.

Step 7. The IMS voice session establishment is continued.

At least for the duration of the IMS voice call, the target NG-RAN (i.e., gNB or base station) may be configured to not trigger inter NG-RAN (i.e., gNB or base station) handover back to source NG-RAN (i.e., gNB or base station).
<Problems to be Solved by the Disclosure of the Present Specification>

Even if the UE goes out of Wi-Fi coverage while using Voice over Wi-Fi (VoWiFi), the Wi-Fi call needs to be handed over to 3GPP access to ensure that voice service can be provided seamlessly. Since the UE receives an indication that IMS voice is supported in the process of registering for 3GPP access, handover to 3GPP access may be performed.

At this time, if the network supports IMS voice through EPS fallback/RAT fallback, there is a problem that the handed over PDU session cannot be EPS fallback/RAT fallback.

The specific reasons are as follows.

The existing EPS fallback/RAT fallback procedure is performed during the PDU session modification procedure. However, since handover between non-3GPP and 3GPP is performed through the PDU session establishment procedure, EPS fallback/RAT fallback cannot be supported.

Also, even if EPS fallback/RAT fallback is supported in the PDU session establishment procedure similar to the conventional procedure, a problem occurs.

Figure 11:
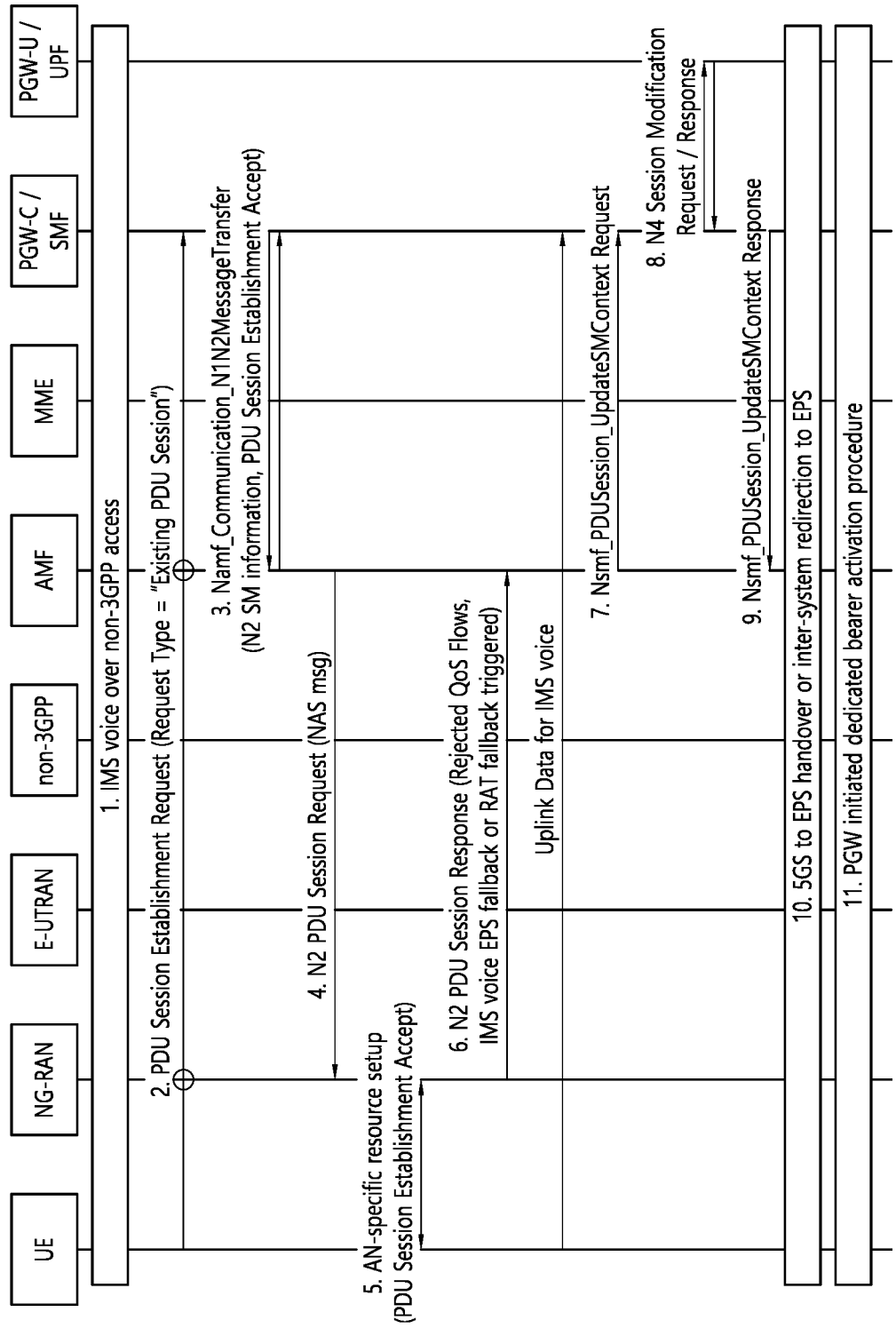
FIG. 11 is a signal flow diagram illustrating a procedure of supporting EPS fallback/RAT fallback in the PDU session establishment procedure.

For example, it is assumed that EPS fallback/RAT fallback is supported in the PDU session establishment procedure through the procedure shown in FIG. 11.

FIG. 11 is a signal flow diagram illustrating a procedure of supporting EPS fallback/RAT fallback in the PDU session establishment procedure.

In the example of FIG. 11, it is assumed that the UE provides VoWiFi service through N3IWF, and it is assumed that the network supports IMS voice service through EPS fallback.

Step 1. It is assumed that the UE is using VoWiFi over non-3GPP access. At this time, it is assumed that the UE is also registered to 3GPP access. If the UE is not registered to 3GPP access, a registration procedure may be performed before proceeding to step 2.

Step 2. The UE may handover a PDU session for VoWiFi service to 3GPP access for a specific reason (e.g., out of coverage of non-3GPP access, successfully registered to 3GPP access, or improved 3GPP access radio conditions, etc.). For this, the UE transmits a PDU session establishment request message. At this time, according to the conventional art, the PDU session establishment request message is transmitted by setting the request type is to "Existing PDU Session" and including the PDU session ID of the PDU session to be handover.

Step 3-4. Upon receiving the handover request from the UE, the SMF may handover the PDU session to 3GPP access. The SMF transmits N2 SM information to the RAN to setup the same QoS flow as the PDU session used in non-3GPP access. In this case, in general, a 5 QI=5 QoS flow (e.g., for IMS signaling) and a 5 QI=1 QoS flow (e.g., for IMS voice traffic) are setup. In addition, the SMF also transmits a PDU session establishment accept message.

Step 5. The SMF transmits N2 information to the NG-RAN (i.e., gNB or base station) through the AMF. In this case, the AMF transmits to the NG-RAN (i.e., gNB or base station) using the PDU session resource setup. Upon receiving the N2 information, the NG-RAN (i.e., gNB or base station) recognizes that it should setup a 5 QI=1 QoS flow. At this time, according to the information configured in the base station, the base station knows that EPS fallback needs to be triggered, and initiates a related procedure. The base station performs a handover procedure or inter-system redirection procedure to EPS according to the state of the UE (e.g., CM-CONNECTED state or CM-IDLE state or CM-CONNECTED with RRC_INACTIVE state, etc.) and whether the network supports N26. In addition, the base station transmits a PDU session establishment accept message to the UE. Upon receiving the PDU session establishment accept message, the UE determines that the handover has been successful. Therefore, thereafter, uplink traffic is transmitted.

Step 6-7. In step 5, the base station informs the SMF that the 5 QI=5 QoS flow is setup but the 5 QI=1 QoS flow is not setup, and transmits by setting the cause to "IMS voice EPS fallback" or "RAT fallback triggered".

Step 8. The SMF updates downlink TEID information to the UPF to send downlink traffic to 3GPP access. From this process, the UPF starts to transmit downlink traffic to 3GPP access.

Step 10. After step 6, the EPS fallback initiated by the NG-RAN (i.e., gNB or base station) starts, and the UE moves to the EPS to receive service.

Step 11. The PGW-C/SMF recognizes that the UE has moved to the EPS and performs a procedure of establishing a QCI=1 dedicated bearer for IMS voice.

In the above procedure, after step 5, the UE immediately starts transmitting voice traffic through 3GPP access. However, in this case, since there is no 5 QI=1 QoS flow for voice traffic, QoS for IMS voice is not supported, so the quality of service may deteriorate. This situation continues until the QCI=1 dedicated bearer is created in step 11 after the UE completes the EPS fallback.

This problem occurs not only when VoWiFi calls are serviced through N3IWF-5GC, but also occurs when service is provided through ePDG-EPC. Also, the same problem occurs with RAT fallback rather than EPS fallback.

<Disclosure of the Present Specification>

The Disclosures Of The Present Specification provide methods for solving the above-described problems.

Although each of the following drawings shows an embodiment of each disclosure, the embodiments of the drawings may be implemented in combination with each other.

I. First Disclosure of the Present Specification: Network-Based Solution

I-1. First Method of the First Disclosure of the Present Specification: NG-RAN (i.e., gNB or Base Station) Based Solution Hereinafter, it will be described with reference to FIG. 12.

Figure 12:
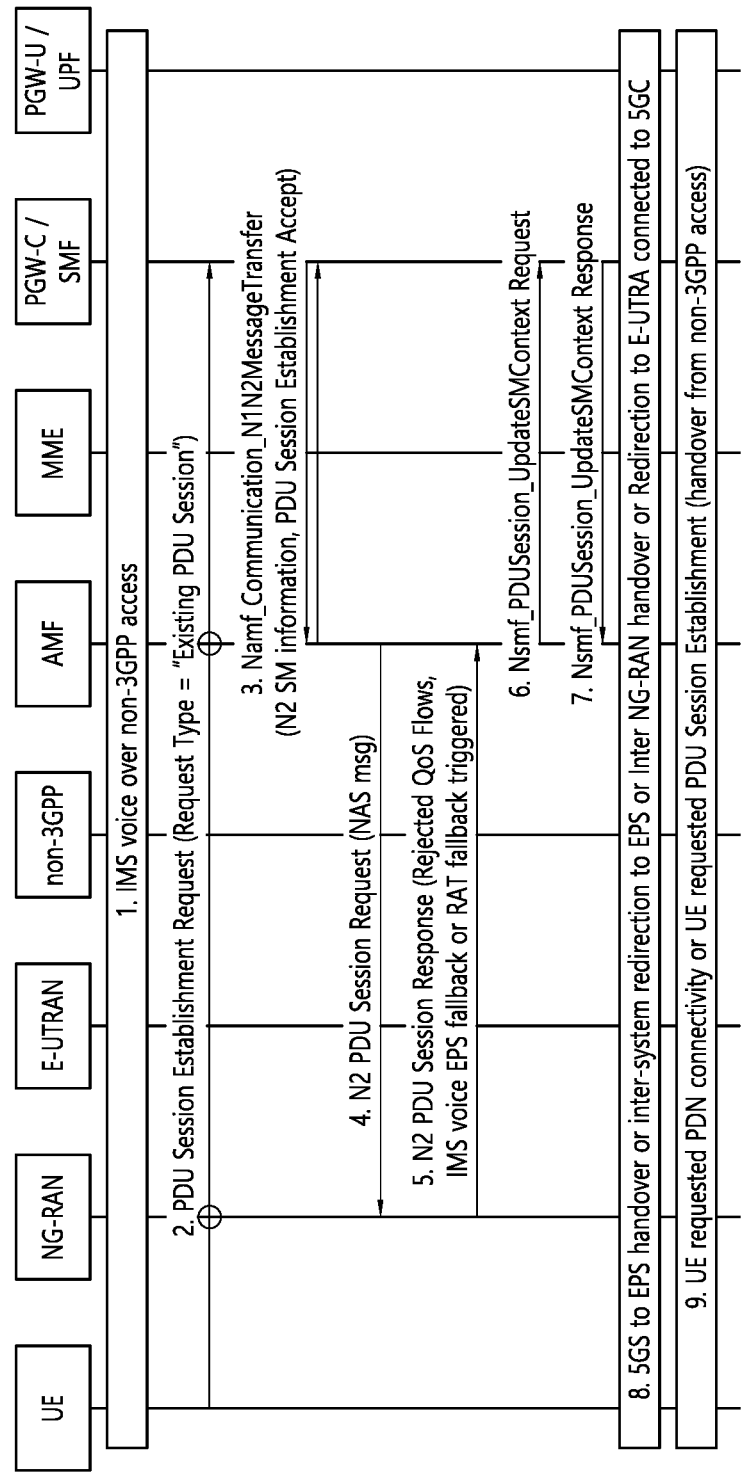
FIG. 12 is an exemplary signal flow diagram illustrating a network-based solution according to the first method of the first disclosure of the present specification.

FIG. 12 is an exemplary signal flow diagram illustrating a network-based solution according to the first method of the first disclosure of the present specification.

FIG. 12 assumes that the UE receives a VoWiFi service through the N3IWF.

Steps 1-4. It is the same as that of steps 1 to 4 of FIG. 11.

Step 5. The NG-RAN (i.e., gNB or base station) receives N2 information from the SMF through the AMF. At this time, the AMF transmits the N2 information to the NG-RAN (i.e., gNB or base station) using PDU session resource setup. Upon receiving the N2 information, the NG-RAN (i.e., gNB or base station) recognizes that it should setup a 5 QI=1 QoS flow and a 5 QI=5 QoS flow. At this time, it can be known that the base station needs to trigger EPS fallback according to information configured in the base station. Accordingly, the base station rejects the PDU session setup request requested by the SMF even though the 5 QI=5 QoS flow can be setup. That is, while transmitting the PDU session resource setup response message, information on the corresponding PDU session is included in a list of PDU sessions in which resource setup has failed (Resource Failed to Setup List) and transmitted. In this case, the base station sets the cause field in the PDU session resource setup response message to "IMS voice EPS Fallback" or "RAT Fallback triggered". In addition, the base station does not transmit a PDU session establishment accept message to the UE because it has rejected the PDU session setup.

Step 6-7. The AMF transmits information received from the NG-RAN (i.e., gNB or base station) to the SMF.

Step 8. After step 5, EPS fallback or RAT fallback initiated by the NG-RAN (i.e., gNB or base station) may be started. The UE moves to EPS to receive service or is connected to E-UTRA connected to 5GC to receive service.

Step 9. When the UE moves to EPS, the UE performs a procedure of handing over a PDU session for VoWiFi being used in non-3GPP to 3GPP-EPC. If redirected to E-UTRA connected to 5GC, the UE performs a procedure for moving a non-3GPP PDU session to 3GPP access. In this case, the UE may perform handover again through the PDU session establishment request message even before the NAS re-transmission timer configured in step 2 expires. Alternatively, the SMF may perform the handover procedure while transmitting a response to the PDU session establishment request message received in step 2 after the RAT fallback is finished.

I-2. Second Method of the First Disclosure of the Present Specification: SMF-Based Solution In order to minimize the change in the base station operation, the second method of the first disclosure provides an SMF-based solution.

The SMF may recognize that a PDU session for VoWiFi in non-3GPP access is to be handed over to 3GPP access based on the PDU session establishment request message received from the UE (e.g., may determine based on PDU session information such as DNN, S-NSSAI, etc.). Therefore, the SMF may transmit the N2 SM information by including only 5 QI=1 QoS flow information in shown in step 3 of FIG. 12. In this way, the base station can reject the setup request for the 5 QI=1 QoS flow. The base station rejects the PDU session setup request because there is no other QoS flow to setup. That is, while transmitting the PDU session resource setup response message in step 5, information on the corresponding PDU session is included in a list of PDU sessions in which resource setup has failed and transmitted. The base station sets the cause field in the PDU session resource setup response message to "IMS voice EPS Fallback" or "RAT Fallback triggered". In addition, the base station does not transmit a PDU session establishment accept message to the UE because it has rejected the PDU session setup.

In order to use this method, when the UE receives a voice service in 3GPP access, the SMF needs to be able to predict that EPS fallback/RAT fallback will occur. The SMF may perform the prediction based on a configuration from an operator. For example, based on the user location information and RAT type information sent by the AMF, the SMF may determine whether EPS fallback/RAT fallback is required for the current UE.

In both the first method and the second method, the SMF may know that the non-3GPP PDU session for VoWiFi is to be moved to 3GPP access, and may not transmit the PDU session establishment accept message. In addition, the SMF may explicitly inform that EPS fallback/RAT fallback will occur by transmitting a PDU session establishment reject message to the UE. To this end, before the SMF transmits N2 SM information, it may first transmit a PDU session establishment reject message to the UE, and then may transmit N2 SM information so that EPS fallback/RAT fallback may occur in the NG-RAN (i.e., gNB or base station).

II. Second Disclosure of the Present Specification: UE-Based Solution

In the case of a network-based solution, when the UE requests a handover for a PDU session, the NG-RAN (i.e., gNB or base station) performs EPS fallback and then the UE should perform a PDU session handover procedure again. Therefore, it takes a long time until the handover is finished. In addition, when the UE requests a handover, it is highly likely that the signal of non-3GPP access (e.g., Wi-Fi) is out of coverage due to a weak signal. If the handover time takes a long time, the UE's voice service may be affected.

In order to reduce the handover time, a UE-based solution may be used.

Figure 13:
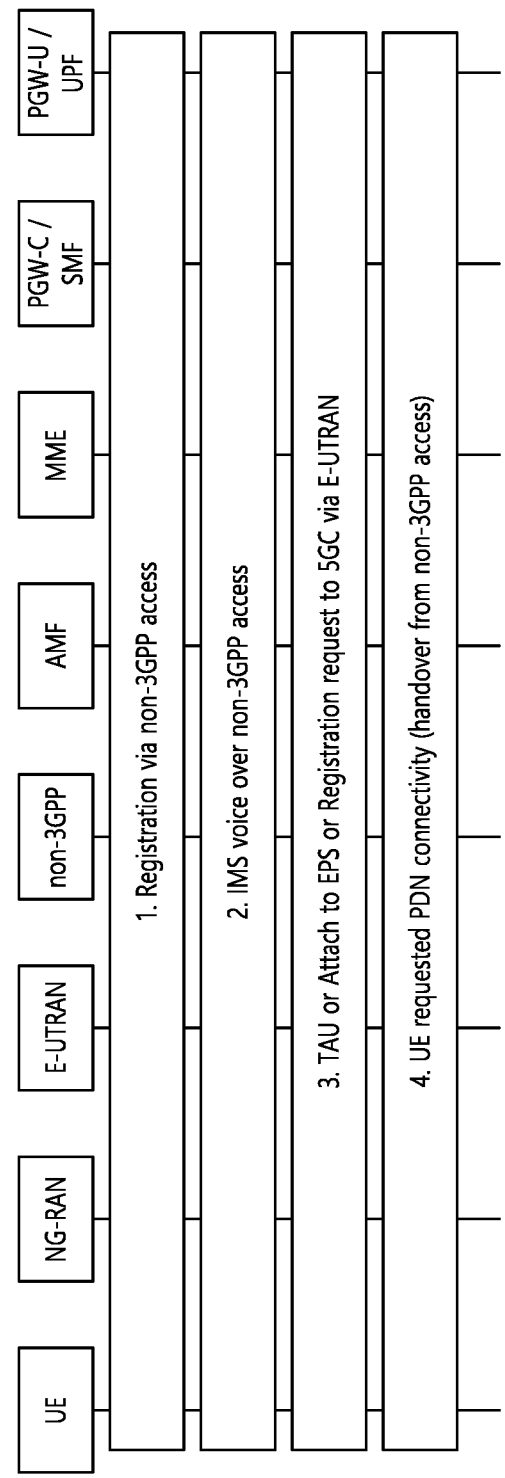
FIG. 13 is an exemplary signal flow diagram illustrating a UE-based solution according to the second disclosure of the present specification.

FIG. 13 is an exemplary signal flow diagram illustrating a UE-based solution according to the second disclosure of the present specification.

FIG. 13 assumes that the UE receives a VoWiFi service through the N3IWF.

Step 1. In the process of registering the UE to non-3GPP access, in addition to "IMS voice over PS Session Supported Indication", the AMF may transmit to the UE "Handover VoWiFi to EPS indication" which means to handover directly to EPS in case of VoWiFi or "Handover VoWiFi to E-UTRA connected to 5GC" which means to perform RAT change to E-UTRA connected to 5GC (Or an indication indicating that IMS voice is provided through EPS fallback/RAT fallback may be transmitted). In this case, the AMF may transmit the corresponding indication based on information received from the UE. That is, when the UE transmits capability information indicating that a VoWiFi call is possible (or an indication asking how to handle a VoWiFi call or an indication requesting processing of a VoWiFi call, etc.) by including in the registration request message, the AMF may transmit the "Handover VoWiFi to EPS indication" or "Handover VoWiFi to E-UTRA connected to 5GC indication". In addition, the existing "IMS voice over PS Supported Indication" may be transmitted based on the UE capability information. That is, when the UE transmits capability information indicating that an IMS voice call is possible in 3GPP access or non-3GPP access (or an indication asking whether an IMS voice call is possible or an indication requesting processing of an IMS voice call, etc.) by including in the registration request message, the AMF may transmit "IMS voice over PS Session Supported Indication".

Step 2. It is assumed the UE is using VoWiFi over non-3GPP access. At this time, it is assumed that the UE is also registered to 3GPP access.

Step 3. The UE determines which operation to perform according to the indication received in step 1, i.e., "Handover VoWiFi to EPS indication" or "Handover VoWiFi to E-UTRA connected to 5GC indication".

If "Handover VoWiFi to EPS indication" is received, the UE searches for an E-UTRA cell connected to the EPC and performs a TAU procedure or an attach procedure. Whether to perform the TAU procedure or the attach procedure depends on the conventional art. (For example, if the UE is already registered to 5GC and supports interworking using the N26 interface, TAU may be performed. If the UE is not registered to 5GC and supports interworking using the N26 interface, attach procedure may be performed). When performing the attach procedure, the UE may perform the handover attach procedure in combination with step 4.

If "Handover VoWiFi to E-UTRA connected to 5GC indication" is received, the UE searches for an E-UTRA cell connected to 5GC and performs a registration procedure.

Step 4. After performing the TAU procedure or registration procedure, the UE performs a procedure for handover of a VoWiFi session in non-3GPP access.

The above procedure may be performed even if an indication is not received from the network in step 1. For example, based on the configuration information of the network that the UE knows in advance (e.g., if RAT fallback or EPS fallback has been performed when a call was previously attempted through 3GPP access, or if it is preconfigured in the UE, etc.) it is possible to perform the above operation without receiving the indication.

Also, according to the conventional art, when the UE attaches through ePDG, the IMS voice support indication is not received. Therefore, in order to deliver the above information, the UE needs to provide related information when attaching to the ePDG. The related information may be transmitted by being included in IKEv2 signaling. Alternatively, in order to eliminate the ePDG effect, "Handover VoWiFi to EPS indication" and "Handover VoWiFi to E-UTRA connected to 5GC indication" may be transmitted when the UE performs a registration procedure to 5GC through 3GPP access.

III. Summary of the First Disclosure and the Second Disclosure

Hereinafter, the contents of the first disclosure and the second disclosure will be summarized and described. In particular, in the following, amendments to the standard document are presented according to the contents of the first disclosure and the second disclosure.

III-1. First Example

Figure 14:
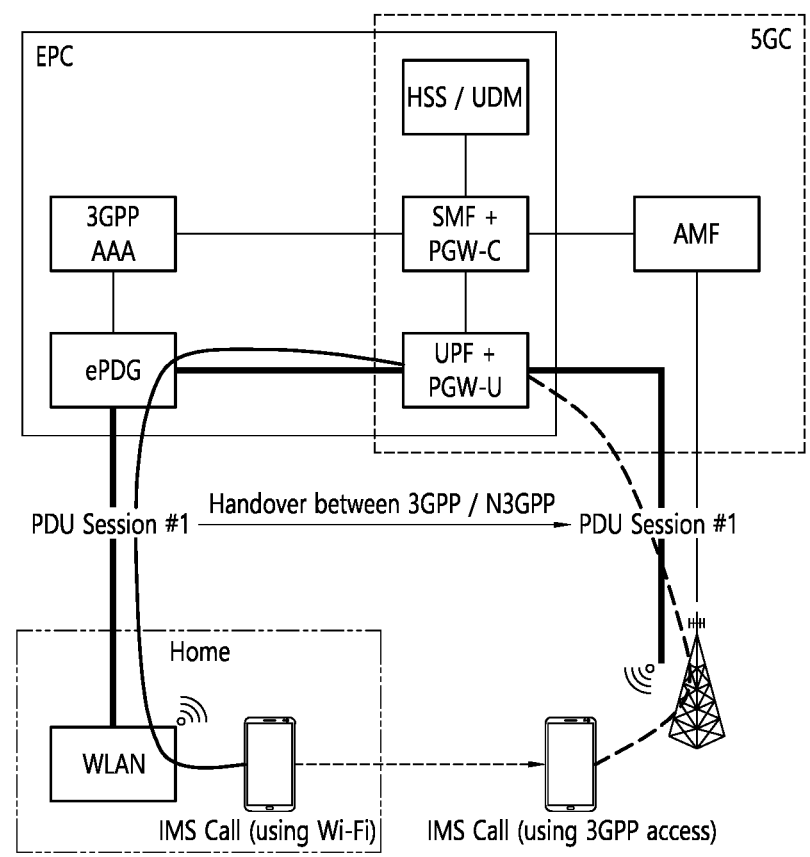
FIG. 14 is an exemplary diagram illustrating a voice call handover to 3GPP access.

FIG. 14 is an exemplary diagram illustrating a voice call handover to 3GPP access.

IMS voice service may be supported both in 3GPP access and non-3GPP access. The AMF may provide an indication toward the UE during the registration procedure to indicate if an IMS voice over PS session is supported or not supported in each access. In addition, when a UE is attached to EPC via ePDG, the UE may make an IMS voice call over non-3GPP access.

As shown in FIG. 14, during the call, when the UE moves out of the non-3GPP access coverage, the UE should try to move the IMS voice session to 3GPP access to provide voice call continuity if the UE received "IMS voice over PS Session Supported" indication over 3GPP access.

The handover from non-3GPP access connected to EPC to 3GPP access connected to 5GC may be supported based on PDU session establishment request message (including Request Type indicating "Existing PDU Session) via PDU session establishment procedure. If the network supports IMS voice over 3GPP access connected to 5GC, the handover procedure may be successful.

However, if network supports IMS voice by using EPS fallback (or RAT fallback), how the network provides service continuity for IMS voice session over non-3GPP access is not specified.

The same issue exists when the UE has IMS voice session via N3IWF and the UE moves out of the non-3GPP access coverage.

Currently, the EPS fallback (or RAT fallback) procedure may be triggered by the NG-RAN (i.e., gNB or base station) during the PDU session modification procedure. When the NG-RAN (i.e., gNB or base station) detects the establishment of QoS flow for IMS voice (e.g., 5 QI=1 QoS flow), the NG-RAN (i.e., gNB or base station) may report fallback to the SMF using PDU Session Resource Modify Response Transfer IE (e.g., if NG-RAN (i.e., gNB or base station) accepted other QoS flows except 5 QI=1 QoS flow) or PDU Session Resource Modify Unsuccessful Transfer IE (e.g., if NG-RAN (i.e., gNB or base station) does not accepted modification of QoS flows of the PDU session).

It may mean that the SMF may update or establish other QoS flows during the PDU session modification to setup, e.g., 5 QI=1 QoS flow and NG-RAN (i.e., gNB or base station) may only reject the QoS flow for IMS voice.

Upon reception of the PDU session resource modify request to setup a QoS flow for IMS voice, if the NG-RAN node (i.e., gNB or base station) is not able to support IMS voice, the NG-RAN node (i.e., gNB or base station) shall initiate EPS fallback or RAT fallback for IMS voice procedure and report unsuccessful establishment of the QoS flow in the PDU Session Resource Modify Response Transfer IE or in the PDU Session Resource Modify Unsuccessful Transfer IE with cause value "IMS voice EPS fallback or RAT Summary 1: EPS fallback (or RAT fallback) procedure is triggered by the NG-RAN (i.e., gNB or base station) by performing handover or redirection during the PDU session modification procedure.

Summary 2: When the SMF requests to setup the IMS voice QoS flows to the NG-RAN (i.e., gNB or base station), the SMF may update or establish other QoS flows. The NG-RAN (i.e., gNB or base station) may only reject QoS flow for IMS voice.

III-1-1: Network-Based Solution

According to the above Summary 1, when the UE handovers IMS voice session from non-3GPP access to 3GPP access, NG-RAN (i.e., gNB or base station) may not trigger handover or redirection to EPC. In order to support EPS fallback (or RAT fallback) during the handover from non-3GPP access, the NG-RAN (i.e., gNB or base station) should trigger the handover or redirection to EPC (or E-UTRA connected to 5GC) during the PDU session establishment procedure.

Proposal 1: The NG-RAN (i.e., gNB or base station) may trigger handover or redirection to EPC (or E-UTRA connected to 5GC) procedure during the PDU session establishment procedure in addition to the PDU session modification procedure.

Even though handover or redirection to EPC (or E-UTRA connected to 5GC) procedure is triggered during the PDU session establishment, there may be another issue caused by the above Summary 2.

When the UE requested to handover IMS voice session from non-3GPP access to 3GPP access, the SMF need to establish at least two QoS flows, one for IMS signaling (e.g., 5 QI=5 QoS flow) and the other one for IMS voice (e.g., 5 QI=1 QoS flow). The SMF may trigger Namf_Communication_N1N2MessageTransfer and include PDU session establishment accept message and N2 SM information to setup IMS signaling and IMS voice QoS flows.

In the NG-RAN (i.e., gNB or base station), according to the above Summary 2, when it receives N2 SM information, the NG-RAN (i.e., gNB or base station) may only reject QoS flow for IMS voice and accept QoS flow for IMS signaling.

As a result, the NG-RAN (i.e., gNB or base station) may send PDU session establishment accept message to the UE.

As soon as the UE receives PDU session establishment accept message, the UE may send uplink IMS voice traffic. Because there is no QoS flow for IMS voice, such voice traffic may not be handled properly in the NG-RAN (i.e., gNB or base station). In order to solve the issue, the NG-RAN (i.e., gNB or base station) should reject the PDU session establishment.

Proposal 2: If the SMF requested to setup a new PDU session with QoS flow for IMS voice, the NG-RAN (i.e., gNB or base station) may reject the PDU session establishment with cause "IMS voice EPS fallback or RAT fallback triggered" and may not forward the NAS message to the UE. After that, the NG-RAN (i.e., gNB or base station) triggers handover or redirection to EPC procedure.

After handover or redirection to EPC (or E-UTRA connected to 5GC) is finished, the IMS voice session over non-3GPP access may still be remained in non-3GPP access. So, the UE should re-try to handover the IMS voice session from non-3GPP access to 3GPP access connected to the EPC.

Proposal 3: After handover or redirection to EPC is finished, the UE may re-try to handover the IMS session from non-3GPP access to 3GPP access connected to the EPC.

III-1-2: UE-based Solution

The main issue of network-based solution is handover delay. After the UE tries to handover an IMS voice session to 3GPP access, network triggers handover or redirection to EPC and then the UE may re-try handover. As a result, the delay may be longer than normal EPS fallback (or RAT fallback) procedure. Considering that the UE tries to handover the IMS voice session over non-3GPP access when the UE is moving out of non-3GPP coverage, there may be possibility of packet loss due to long handover delay.

If a UE could know that the network will perform the EPS fallback procedure, the UE may find and select E-UTRA cell connected to EPC and perform TAU. After that, the UE may handover the IMS voice session from non-3GPP access to 3GPP access connected to EPC. Because the UE directly changes core network, handover delay may be reduced compared to network-based solution.

Proposal 4: When the UE wants to handover IMS voice session from non-3GPP access to 3GPP access, the UE may find E-UTRA cell connected to EPC and perform TAU procedure (or registration procedure) and handover the IMS voice session.

However, the UE does not know whether the network performs EPS fallback (or RAT fallback). So, the network should provide such information during the registration procedure. For example, the AMF may include "Handover IMS session over non-3GPP access to EPC" (or "Handover IMS session over non-3GPP access to E-UTRA connected to 5GC") indication when the UE registers over the 3GPP access.

Proposal 5: During the UE registration to 5GC over 3GPP access, the AMF may provide an indication on whether IMS voice session over non-3GPP access should be moved to EPC.

Because the UE itself has to select E-UTRA cell connected to EPC (or E-UTRA cell connected to 5GC), if there is active data transmission over 3GPP access, those traffics may be dropped in the NG-RAN (i.e., gNB or base station) and service may temporarily be interrupted.

III-1-3. Amendments to Standard Documents

Figure 15:
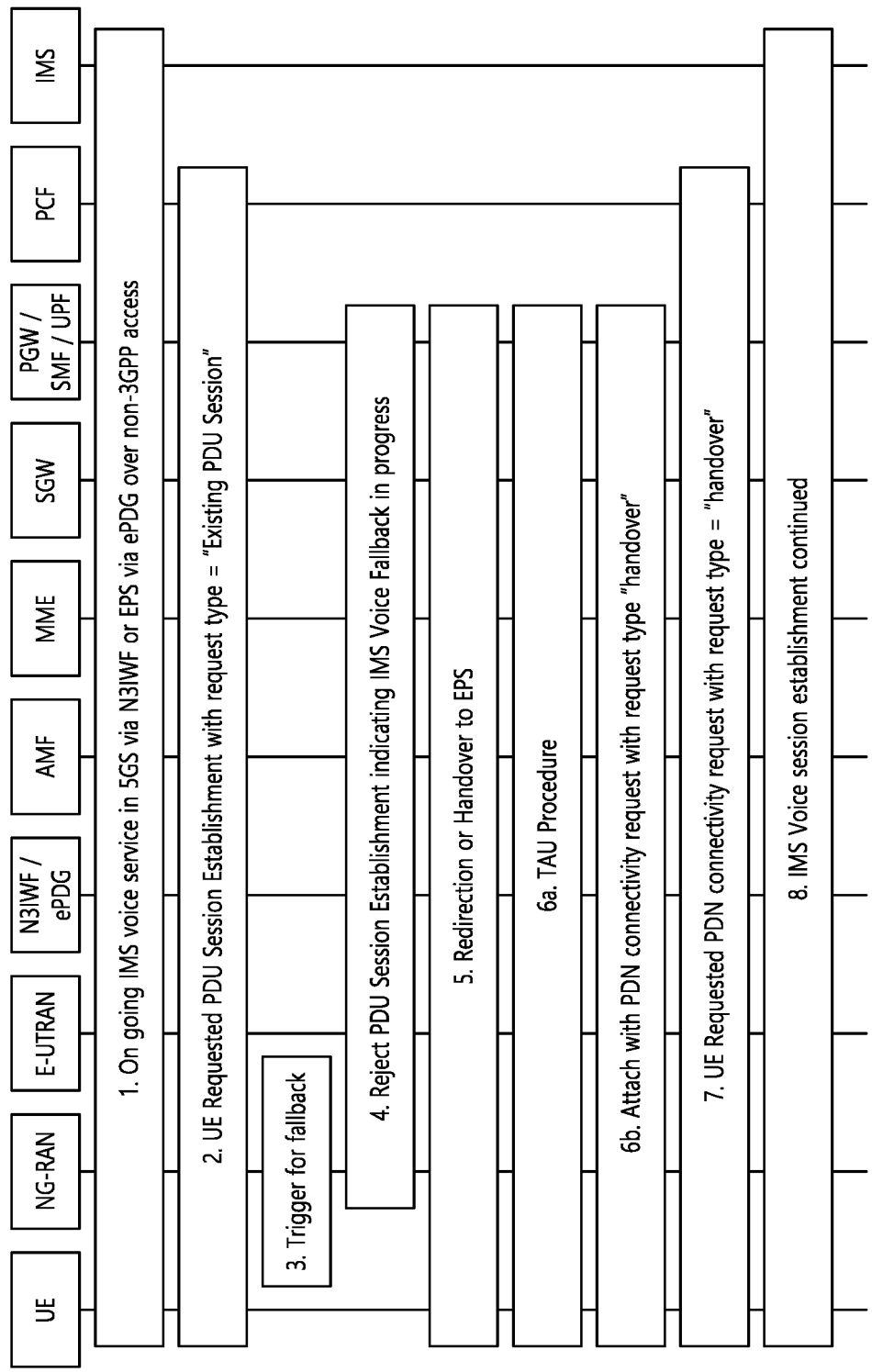
FIG. 15 is an exemplary diagram illustrating an example of the EPS fallback during the handover of a non-3GPP access PDU session or non-3GPP access PDN connection for IMS voice.

FIG. 15 is an exemplary diagram illustrating an example of the EPS fallback during the handover of a non-3GPP access PDU session or non-3GPP access PDN connection for IMS voice.

When the UE is served by the 5G System, the UE may have one or more PDU sessions each including one or more QoS flows. The serving PLMN AMF may transmit an indication towards the UE during the registration procedure that IMS voice over PS session is supported. And the UE has registered in the IMS. If N26 interface is not supported, the serving PLMN AMF transmits an indication towards the UE during the registration procedure that interworking without N26 is supported.

Step 1. The UE registers in 5GS via N3IWF over non-3GPP access or attaches in EPS via ePDG over non-3GPP access and has on going IMS voice session.

Step 2. The UE triggers PDU session establishment procedure to handover an IMS voice session over non-3GPP access. N2 SM information to setup QoS flows for IMS signaling and voice reaches the NG-RAN (i.e., gNB or base station).

Step 3. The NG-RAN (i.e., gNB or base station) may be configured to support EPS fallback for IMS voice. The NG-RAN (i.e., gNB or base station) may decide to trigger fallback to EPS, considering UE capabilities, indication from the AMF (i.e., "Redirection for EPS fallback for voice is possible"), network configuration (e.g., N26 availability configuration) and radio conditions. If the NG-RAN (i.e., gNB or base station) decides not to trigger fallback to EPS, then the procedure may stop here.

The NG-RAN (i.e., gNB or base station) may initiate measurement report solicitation from the UE including E-UTRAN as target.

If the AMF provides an indication (i.e., "Redirection for EPS fallback for voice is not possible"), then AN release via inter-system redirection to EPS may not be performed.

Step 4. The NG-RAN (i.e., gNB or base station) responds indicating failed to setup the PDU session resources received in step 2 by transmitting PDU Session resource setup response message towards the PGW-C+SMF (or H-SMF+P-GW-C via V-SMF) via the AMF with an indication that mobility due to fallback for IMS voice is ongoing.

The PGW-C+SMF discards the UE requested PDU session establishment request message.

Step 5. The NG-RAN (i.e., gNB or base station) initiates either handover, or AN release via inter-system redirection to EPS, considering UE capabilities.

The PGW-C+SMF reports change of the RAT type. When the UE is connected to EPS, either step 6a or 6b is executed.

Step 6a. In the case of 5GS to EPS handover, and in the case of inter-system redirection to EPS with N26 interface, the UE may perform TAU procedure.

Step 6b. This step is for the case of inter-system redirection to EPS without N26 interface. If the UE supports Request Type flag "handover" for PDN connectivity request during the attach procedure and has received the indication that interworking without N26 is supported, then the UE may perform attach procedure with PDN connectivity request message with request type "handover".

Step 7. After completion of the mobility procedure to EPS or as part of the 5GS to EPS handover procedure, the UE may perform the PDN connectivity request procedure and set the Request Type to "handover" and handover IMS voice session over 3GPP access.

Step 8. The IMS voice session establishment is continued. At least for the duration of the voice call in EPS, the E-UTRAN may be configured to not trigger any handover to 5GS.

Figure 16:
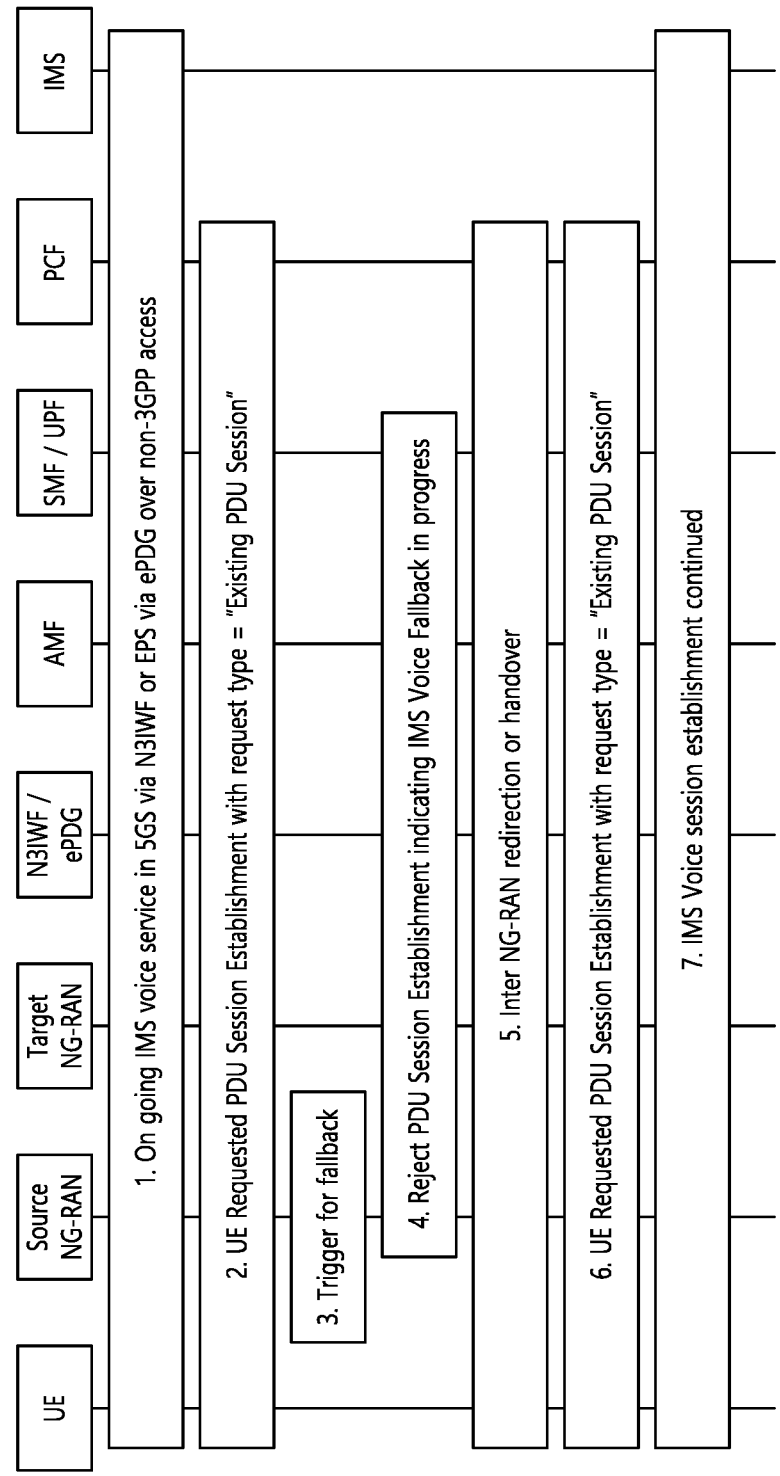
FIG. 16 is an exemplary diagram illustrating an example of the inter-RAT fallback during the handover from a non-3GPP access.

FIG. 16 is an exemplary diagram illustrating an example of the inter-RAT fallback during the handover from a non-3GPP access.

When the UE is served by the 5G system, the UE may have one or more PDU sessions each including one or more QoS flows. The serving PLMN AMF may transmit sent an indication towards the UE during the registration procedure that IMS voice over PS session is supported. And the UE has registered in the IMS.

Step 1. The UE registers in 5GS via N3IWF over non-3GPP access or attaches in EPS via ePDG over non-3GPP access and has on going IMS voice session.

Step 2. The UE triggers PDU session establishment procedure to handover an IMS voice session over non-3GPP access. N2 SM information to setup QoS flows for IMS signaling and voice reaches the NG-RAN (i.e., gNB or base station).

Step 3. The source NG-RAN (i.e., gNB or base station) may be configured to support RAT fallback for IMS voice. The source NG-RAN (i.e., gNB or base station) may decide to trigger RAT fallback, considering UE capabilities, network configuration and radio conditions.

The Source NG-RAN (i.e., gNB or base station) may initiate measurement report solicitation from the UE including target NG-RAN (i.e., gNB or base station).

Step 4. The NG-RAN (i.e., gNB or base station) may respond indicating failed to setup the PDU session resources by transmitting PDU session resource setup response message towards the PGW-C+SMF (or H-SMF+P-GW-C via V-SMF, in case of roaming) with an indication that mobility due to fallback for IMS voice is ongoing. The SMF may discard the UE requested PDU session establishment request message.

Step 5. The Source NG-RAN (i.e., gNB or base station) may initiate Xn based inter NG-RAN (i.e., gNB or base station) handover or N2 based inter NG-RAN (i.e., gNB or base station) handover, or redirection to E-UTRA connected to 5GC. The SMF may report change of the RAT type.

Step 6. After completion of the inter NG-RAN (i.e., gNB or base station) handover or redirection to E-UTRA connected to 5GC, the UE may perform the PDU session establishment and set the request type field to "Existing PDU Session" and handover IMS voice session over 3GPP access. The SMF may report about successful resource allocation and access network information.

Step 7. The IMS voice session establishment is continued.

At least for the duration of the IMS voice call, the target NG-RAN (i.e., gNB or base station) may be configured to not trigger inter NG-RAN (i.e., gNB or base station) handover back to the source NG-RAN (i.e., gNB or base station).

Figure 17:
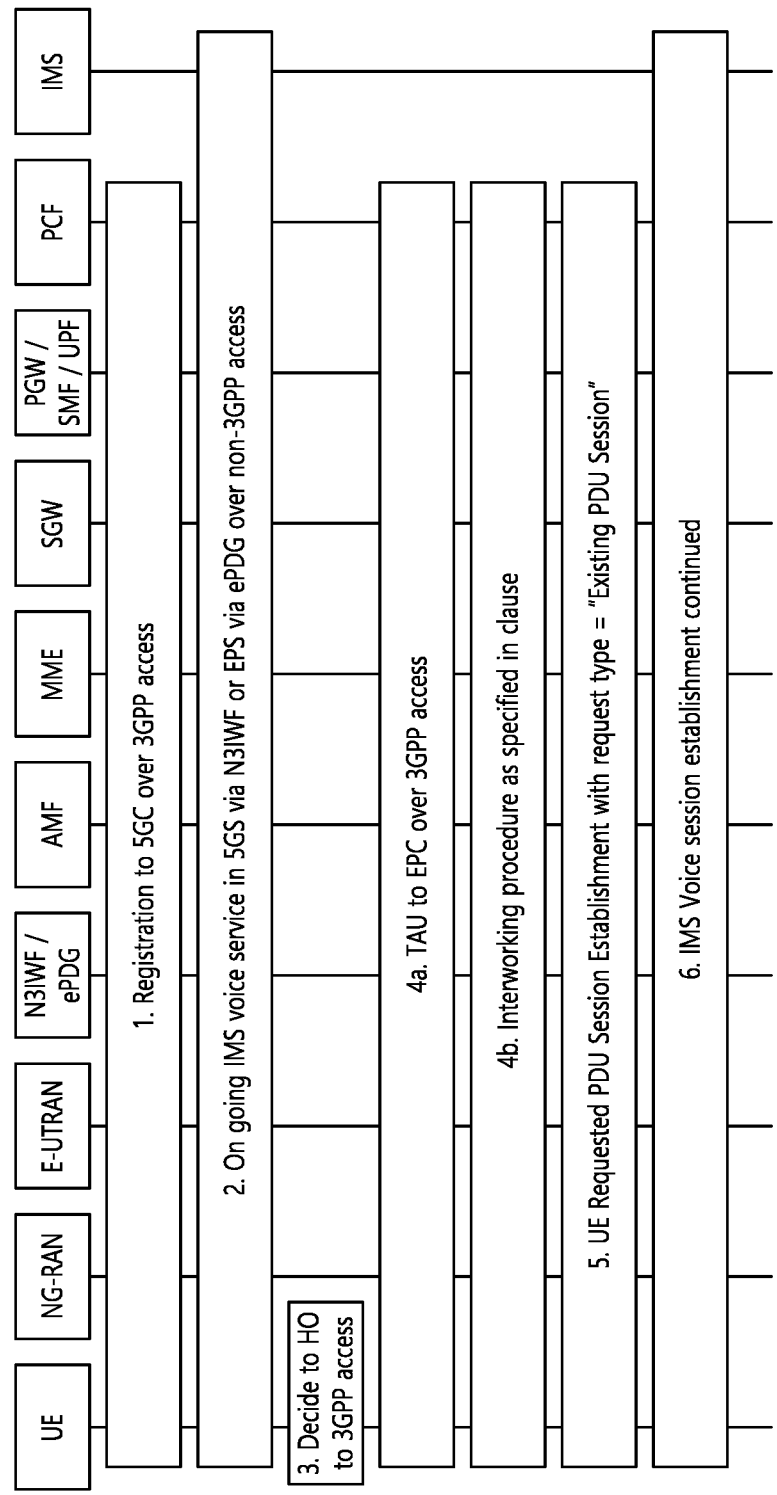
FIG. 17 is an exemplary diagram illustrating an example of the UE triggered EPS fallback procedure to handover an IMS voice session from non-3GPP access.

FIG. 17 is an exemplary diagram illustrating an example of the UE triggered EPS fallback procedure to handover an IMS voice session from non-3GPP access.

When the UE is served by the 5G system, the UE may one or more PDU sessions each including one or more QoS flows. The serving PLMN AMF may transmit an indication towards the UE during the registration procedure that IMS voice over PS session is supported. And the UE has registered in the IMS. If N26 is not supported, the serving PLMN AMF sends an indication towards the UE during the registration procedure that interworking without N26 is supported.

Step 1. The UE registers in 5GS via 3GPP access. During the registration procedure, the AMF provides "Handover IMS session over non-3GPP access to EPC" indication to the UE.

Step 2. The UE registers in 5GS via N3IWF over non-3GPP access or attaches in EPS via ePDG over non-3GPP access and has on going IMS voice session in non-3GPP access.

Step 3. The UE decides to handover the IMS voice session from non-3GPP access to 3GPP access.

Step 4a. In case of interworking with N26, based on "Handover IMS session over non-3GPP access to EPC" indication received in step 1, the UE finds E-UTRA cell connected to EPC and performs TAU procedure to EPC. This triggers inter-system idle mode mobility procedure.

Step 4b. In case of interworking without N26, based on "Handover IMS session over non-3GPP access to EPC" indication received in step 1, the UE initiates interworking procedure.

Step 5. After completion of the mobility procedure to EPS, the UE performs the PDN connectivity procedure and sets the Request Type to "handover" and handovers IMS voice session over 3GPP access.

Step 6. The IMS voice session establishment is continued.

At least for the duration of the voice call in EPS, the E-UTRAN may be configured to not trigger any handover to 5GS.

Figure 18:
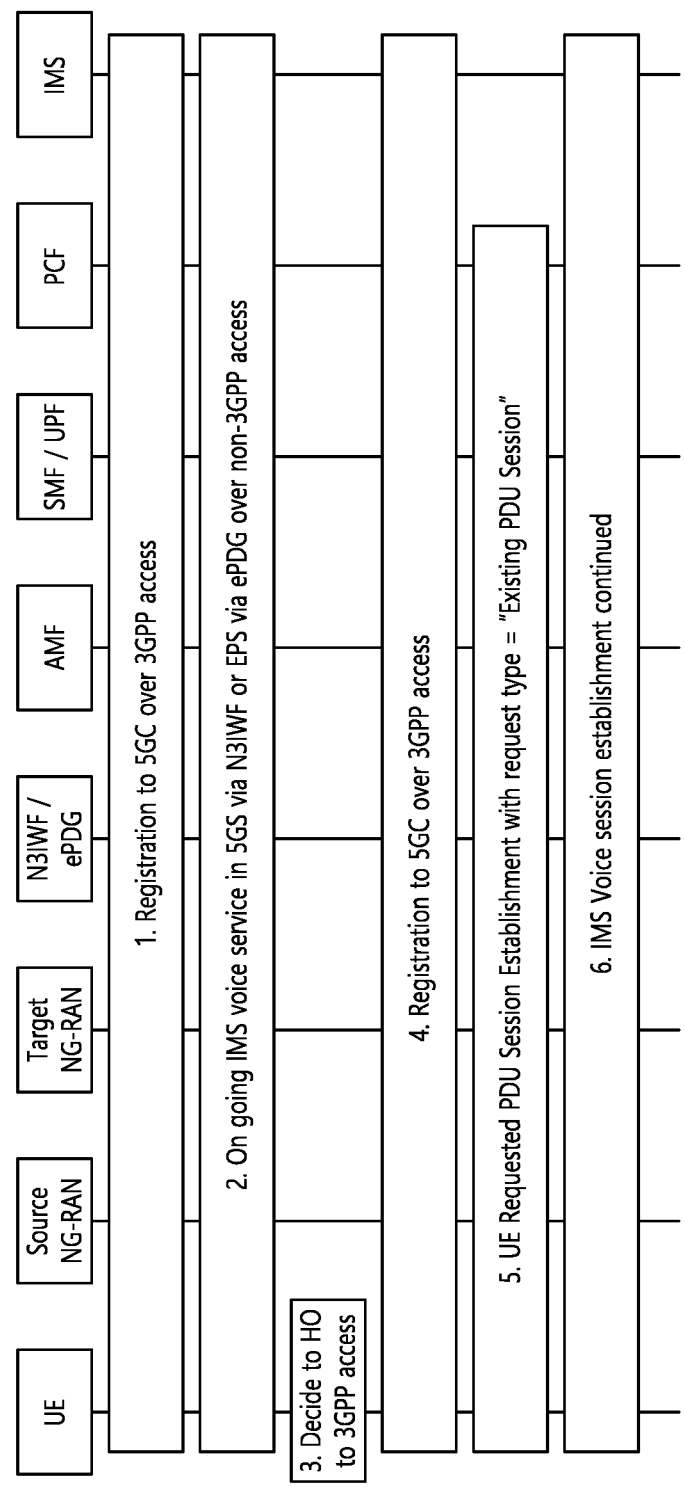
FIG. 18 is an exemplary diagram illustrating an example of the UE triggered inter RAT fallback procedure to handover an IMS voice session from non-3GPP access.

FIG. 18 is an exemplary diagram illustrating an example of the UE triggered inter RAT fallback procedure to handover an IMS voice session from non-3GPP access.

When the UE is served by the 5G system, the UE may have one or more PDU sessions each including one or more QoS flows. The serving PLMN AMF may transmit an indication towards the UE during the registration procedure that IMS voice over PS session is supported. And the UE has registered in the IMS.

Step 1. The UE registers in 5GS via 3GPP access. During the registration procedure, the AMF provides "Handover IMS session over non-3GPP access to E-UTRA connected to 5GC" indication to the UE.

Step 2. The UE registers in 5GS via N3IWF over non-3GPP access or attaches in EPS via ePDG over non-3GPP access and has on going IMS voice session in non-3GPP access.

Step 3. The UE decides to handover the IMS voice session from non-3GPP access to 3GPP access.

Step 4. Based on "Handover IMS session over non-3GPP access to E-UTRA connected to 5GC" indication received in step 1, the UE finds E-UTRA cell connected to 5GC and initiates registration procedure.

Step 5. After completion of registrations procedure, the UE initiates handover procedure and handovers IMS voice session over 3GPP access.

Step 6. The IMS voice session establishment is continued.

At least for the duration of the IMS voice call, the target NG-RAN (i.e., gNB or base station) may be configured to not trigger inter NG-RAN (i.e., gNB or base station) handover back to the source NG-RAN (i.e., gNB or base station).

III-2. Second Example

Figure 19:
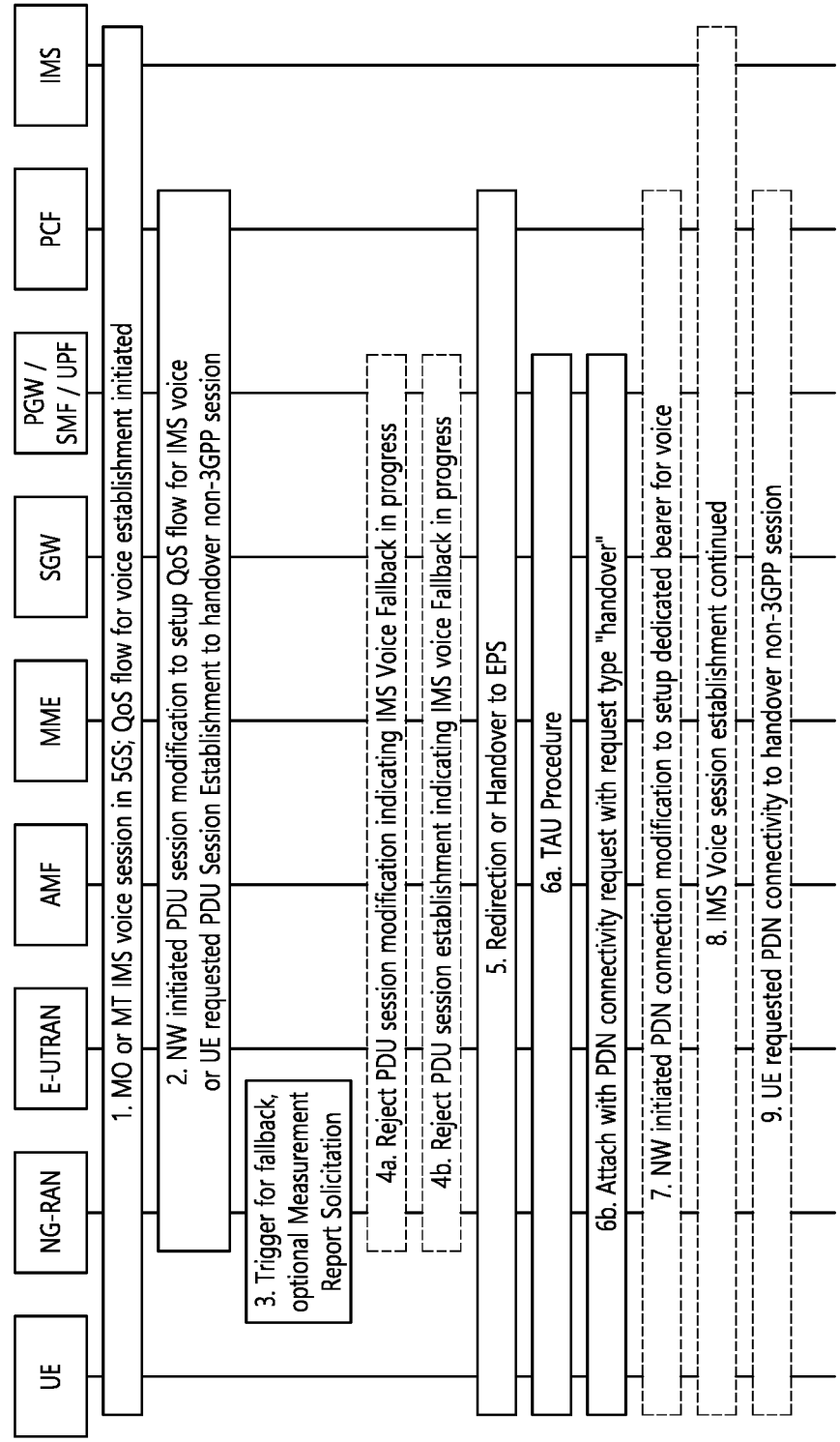
FIG. 19 is an exemplary signal flow diagram illustrating an enhancement of an EPS fallback procedure for IMS voice according to one disclosure of the present specification.

FIG. 19 is an exemplary signal flow diagram illustrating an enhancement of an EPS fallback procedure for IMS voice according to one disclosure of the present specification.

FIG. 19 is an enhancement of the EPS fallback procedure for IMS voice shown in FIG. 9 according to the disclosure of the present specification. Hereinafter, only the parts different from the procedure shown in FIG. 9 will be described, and the description of FIG. 9 will be used for the same content.

When the UE is served by the 5G system, the UE may have one or more PDU sessions each including one or more QoS flows. The serving PLMN AMF may send an indication towards the UE during the registration procedure that IMS voice over PS session is supported. And the UE has registered in the IMS. If N26 is not supported, the serving PLMN AMF sends an indication towards the UE during the registration procedure that interworking without N26 is supported.

Step 1. The UE camps on NG-RAN (i.e., gNB or base station) in the 5GS. An MO or MT IMS voice session establishment may be initiated or the UE may have IMS voice session via non-3GPP access.

Step 2. A message for network initiated PDU session modification procedure to setup QoS flow for voice reaches the NG-RAN (i.e., gNB or base station). Or, a message for UE requested PDU session establishment procedure to handover IMS voice session (i.e., IMS PDU session including QoS flow for IMS signaling and QoS flow for voice or IMS PDN connection including bearer for IMS signaling and bearer for voice) reaches the NG-RAN (i.e., gNB or base station).

Step 3. Since this step is the same as step 3 of FIG. 9, it will not be described.

Step 4a. If network initiated PDU session modification procedure is performed, step 4a may be executed and step 4b may be skipped. Otherwise, step 4a may be skipped and step 4b may be executed. The NG-RAN (i.e., gNB or base station) responds indicating rejection of the PDU session modification request message received in step 2 by transmitting PDU session response message towards the PGW-C+SMF (or H-SMF+P-GW-C via V-SMF) via the AMF with an indication that mobility due to fallback for IMS voice is ongoing.

Step 4b. The NG-RAN (i.e., gNB or base station) responds indicating rejection of the message for PDU session establishment procedure received in step 2 by transmitting PDU session response message towards the PGW-C+SMF (or H-SMF+P-GW-C via V-SMF, in case of roaming) via the AMF with an indication that mobility due to fallback for IMS voice is ongoing. The PGW-C+SMF stops the UE requested PDU session establishment procedure.

Step 5. Since this step is the same as step 5 of FIG. 9, it will not be described.

Step 6a. This step is the same as step 6a of FIG. 9, and thus will not be described.

Step 6b. This step is the same as step 6b of FIG. 9, and thus will not be described.

Step 7. If network initiated PDU session modification procedure is performed, steps 7 and 8 may be executed and step 9 may be skipped. Otherwise, steps 7 and 8 may be skipped and step 9 may be executed. After completion of the mobility procedure to EPS or as part of the 5GS to EPS handover procedure, the SMF/PGW performs the setup of the dedicated bearer for IMS voice, mapping the 5G QoS to EPC QoS parameters. The PGW-C+SMF reports about successful resource allocation and access network information.

Step 8. Since this step is the same as step 8 of FIG. 9, it will not be described.

Step 9. After completion of the mobility procedure to EPS or as part of the 5GS to EPS handover procedure, the UE may perform the PDN connectivity procedure and set the Request Type to "handover" to handover IMS PDU session or IMS PDN connection from non-3GPP access to 3GPP access.

At least for the duration of the voice call in EPS, the E-UTRAN is configured to not trigger any handover to 5GS.

Figure 20:
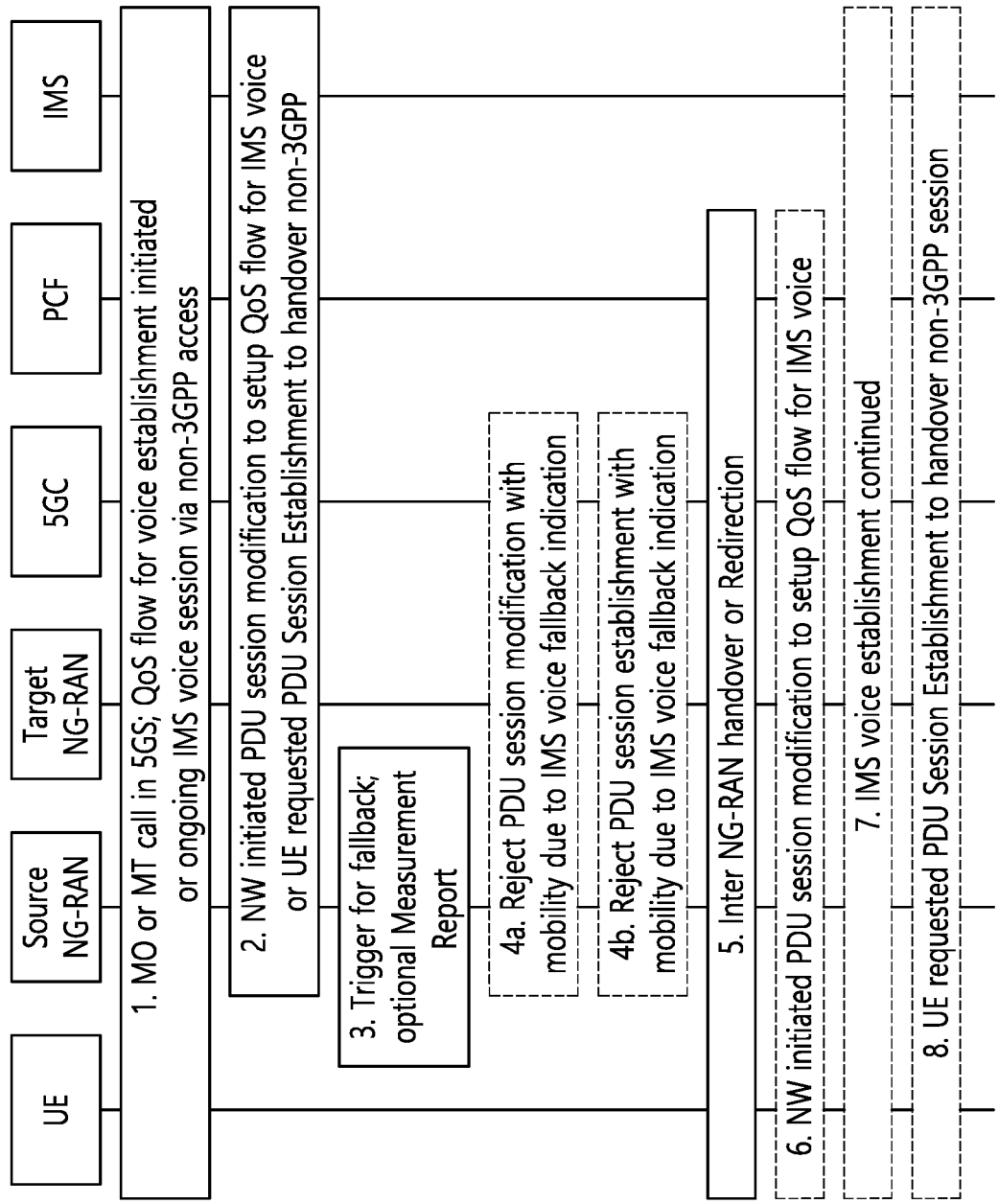
FIG. 20 is an exemplary signal flow diagram illustrating an enhancement of the RAT fallback procedure within 5GS for IMS voice according to one disclosure of the present specification.

FIG. 20 is an exemplary signal flow diagram illustrating an enhancement of the RAT fallback procedure within 5GS for IMS voice according to one disclosure of the present specification.

FIG. 20 is an enhancement of the RAT fallback procedure within 5GS for IMS voice shown in FIG. 10 according to one disclosure of the present specification. Hereinafter, only the parts different from the procedure shown in FIG. 10 will be described, and the description of FIG. 10 will be used for the same content.

When the UE is served by the 5GC, the UE may have one or more PDU sessions each including one or more QoS flows. The serving PLMN AMF has sent an indication towards the UE during the registration procedure that IMS voice over PS session is supported.

Step 1. The UE camps on the source NG-RAN (i.e., gNB or base station) in the 5GS. An MO or MT IMS voice session establishment may be initiated or the UE may have IMS voice session via non-3GPP access.

Step 2. A message according to network initiated PDU session modification procedure to setup QoS flow for IMS voice may reach the source NG-RAN (i.e., gNB or base station). Or, a message for UE requested PDU Session establishment procedure to handover IMS voice session (i.e., IMS PDU session including QoS flow for IMS signaling and QoS flow for voice or IMS PDN connection including bearer for IMS signaling and bearer for voice) reaches the NG-RAN (i.e., gNB or base station).

Step 3. Since this step is the same as step 3 of FIG. 10, it will not be described.

Step 4a. If network initiated PDU session modification procedure is performed, step 4a may be executed and step 4b may be skipped. Otherwise, step 4a may be skipped and step 4b may be executed. The Source NG-RAN (i.e., gNB or base station) responds indicating rejection of the PDU session modification request message received in step 2 by transmitting PDU session response message towards the SMF (or V-SMF, in case of roaming) via the AMF with an indication that mobility due to fallback for IMS voice is ongoing. The SMF maintains the PCC rule(s) associated with the QoS flow(s).

Step 4b. The Source NG-RAN (i.e., gNB or base station) responds indicating rejection of the PDU session establishment request message received in step 2 by transmitting PDU session response message towards the SMF (or V-SMF, in case of roaming) via the AMF with an indication that mobility due to fallback for IMS voice is ongoing. The SMF stops the UE requested PDU session establishment procedure.

Step 5. Since this step is the same as step 5 of FIG. 10, it will not be described.

Step 6. If network initiated PDU session modification procedure is performed, steps 6 and 7 may be executed and step 8 may be skipped. Otherwise, steps 6 and 7 may be skipped and step 8 may be executed. After completion of the inter NG-RAN (i.e., gNB or base station) (inter-RAT) handover or redirection to E-UTRA connected to 5GC, the SMF re-initiates the PDU session modification procedure to setup QoS flow for IMS voice. The SMF reports about successful resource allocation and access network information.

Step 7. Since this step is the same as step 7 of FIG. 10, it will not be described.

Step 8. After completion of the inter NG-RAN (i.e., gNB or base station) (inter-RAT) handover or redirection to E-UTRA connected to 5GC, the UE may perform the PDU session establishment procedure and set the Request Type to "existing PDU Session" to handover IMS PDU session or IMS PDN connection from non-3GPP access to 3GPP access.

At least for the duration of the IMS voice call, the target NG-RAN (i.e., gNB or base station) may be configured to not trigger inter NG-RAN (i.e., gNB or base station) handover back to the source NG-RAN (i.e., gNB or base station).

III-3. Third Example

As in the second example, while performing EPS/RAT fallback, the NG-RAN (i.e., gNB or base station) may not reject the PDU session establishment request, and may reject only the QoS flow for voice and accept the QoS flow for IMS signaling. In this case, the network uses a match all traffic filter in the default QoS rule in order for the voice traffic of the UE to be serviced through the default QoS flow, so to make sure that voice traffic is not dropped. In addition, when EPS/RAT fallback is performed through redirection in the NG-RAN (i.e., gNB or base station), signaling (e.g., RRC Connection Reconfiguration) for setting up Data Radio Bearer (DRB) with the UE may not be performed. Since the NG-RAN (i.e., gNB or base station) performs redirection through RRC release when redirection is required, performing RRC release after setting up the DRB unnecessarily increases only signaling transmission and reception.

Therefore, in the case of EPS fallback, the EPS fallback procedure for IMS voice shown in FIG. 9 may be enhanced as follows.

Hereinafter, only the parts different from the procedure shown in FIG. 9 will be described, and the description of FIG. 9 will be used for the same content.

Step 1 of FIG. 9. The UE camps on the NG-RAN (i.e., gNB or base station) in the 5GS. An MO or MT IMS voice session establishment may be initiated or the UE may have IMS voice session via non-3GPP access.

Step 2 of FIG. 9. A message for network initiated PDU session modification procedure to setup QoS flow for voice reaches the NG-RAN (i.e., gNB or base station). Alternatively, a message for the UE requested PDU session establishment procedure to handover IMS voice session (i.e., IMS PDU session including QoS flow for IMS signaling and QoS flow for voice or IMS PDN connection including bearer for IMS signaling and bearer for voice) reaches the NG-RAN (i.e., gNB or base station).

Step 4 of FIG. 9. The NG-RAN (i.e., gNB or base station) responds indicating rejection of the PDU session modification request message or the PDU session establishment request message received in step 2 by transmitting PDU session response message towards the PGW-C+SMF (or H-SMF+P-GW-C via V-SMF) via the AMF with an indication that mobility due to fallback for IMS voice is ongoing. The PGW-C+SMF maintains the PCC rule(s) associated with the QoS flow(s).

Step 5 of FIG. 9. The NG-RAN (i.e., gNB or base station) initiates either handover, or AN release via inter-system redirection to EPS, considering UE capabilities. The PGW-C+SMF reports change of the RAT type. When the UE is connected to EPS, either step 6a or 6b is executed. In the case of inter-system redirection to EPS, the NG-RAN (i.e., gNB or base station) may skip radio resource setup for the IMS PDU session with the UE. In this case, the NG-RAN (i.e., gNB or base station) may use DLInformationTransfer message instead of RRCReconfiguration message to send a PDU session establishment accept message to the UE.

IV. Brief Summary of the Disclosures of the Present Specification

IV-1. Network-Based Solution

When the NG-RAN (i.e., gNB or base station) receives the PDU session resource setup and there is a 5 QI=1 QoS flow (or a pre-configured QoS flow for IMS voice) in it, the message for rejecting the PDU session setup is transmitted by setting the cause field in the message to "IMS voice EPS fallback or RAT fallback triggered".

Upon receiving a message for handover or redirection from the NG-RAN (i.e., gNB or base station), the UE may perform EPS fallback or RAT fallback.

The UE may handover the non-3GPP session used in VoWiFi to 3GPP access after EPS fallback or RAT fallback.

IV-2. UE-Based Solutions

The AMF may transmit a response message to the registration request message received from the UE by including an indication in the message, e.g., "Handover VoWiFi to EPS indication" or "E-UTRA indication connected to Handover VoWiFi to 5GC".

When handover for a VoWiFi session is required, the UE may perform a TAU procedure/attach procedure with EPS based on the indication received from the AMF or may perform a registration procedure with E-UTRA connected to 5GC.

After the UE performs the TAU procedure or the registration procedure, the non-3GPP session used in VoWiFi may be handed over to 3GPP access.

According to the disclosures of the present specification described so far, the UE can support handover to 3GPP access while making a VoWiFi call so that the voice service can be seamlessly supported.

Hereinafter, an apparatus to which the above disclosure of the present specification can be applied will be described.

Figure 21:
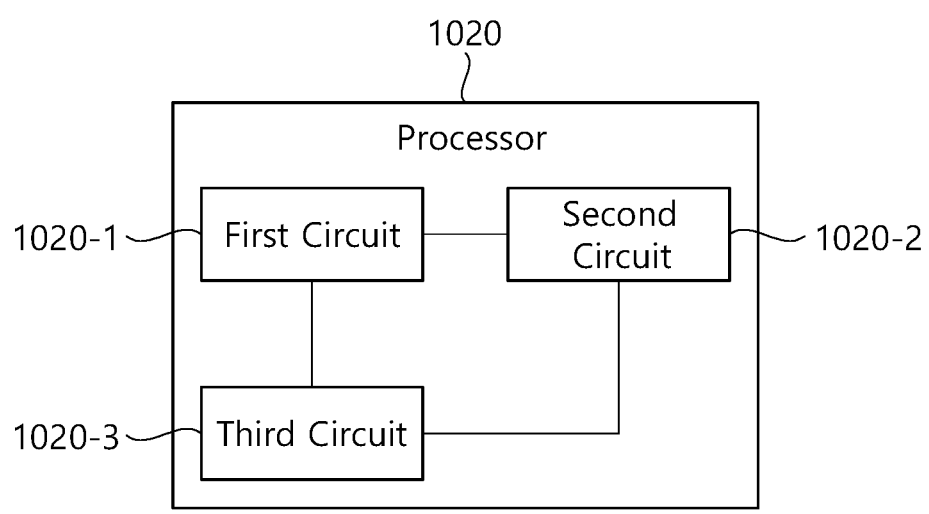
FIG. 21 shows a block diagram of a processor in which the disclosure of the present specification is implemented.

FIG. 21 shows a block diagram of a processor in which the disclosure of the present specification is implemented.

As can be seen with reference to FIG. 21, a processor 1020 in which the disclosure of the present specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be included in the UE, the base station, the AMF or the SMF.

A case in which the processor is included in the UE will be described.

The first circuit 1020-1 of the processor may establish an IMS voice session via a non-3rd Generation Partnership Project (3GPP) access using a Non-3GPP InterWorking Function (N3IWF) or an enhanced Packet Data Gateway (ePDG).

The second circuit 1020-2 of the processor may determine that voice is not supported over a current NG-RAN based on the UE moving the IMS voice session to a 3GPP access.

The third circuit 1020-3 of the processor may, based on the determination, performing a handover of a Protocol Data Unit (PDU) session for the IMS voice session of the non-3GPP access to an Evolved Packet Core (EPC) of the 3GPP access.

A fourth circuit (not shown) of the processor may perform a Tracking Area Update (TAU) or an attach procedure on the 3GPP access.

A fifth circuit (not shown) of the processor may perform a Packet Data Network (PDN) connection establishment procedure to be used for the IMS voice session on the 3GPP access.

The PDN connection establishment procedure may be performed for handover from the non-3GPP access to the 3GPP access.

The PDN connection establishment procedure may comprise transmitting a PDN connection request message including an identifier (ID) indicating a PDU session of the non-3GPP access and a request type indicating requesting a handover.

Determining that the voice is not supported over a current NG-RAN may be performed by a record that is set in the UE or previously performed EPS fallback in the NG-RAN.

A case in which the processor is included in the base station will be described.

The first circuit 1020-1 in the processor of the base station may receive a Protocol Data Unit (PDU) session establishment request message including Quality of Service (QoS) flow setup for an IMS voice session from a Session Management Function (SMF).

The second circuit 1020-2 in the processor of the base station may transmit a PDU session resource setup response message including information related to the fallback of an IMS voice to the SMF through an Access and mobility Management Function (AMF) based on the base station not supporting the IMS voice.

The PDU session resource setup response message may include cause information indicating IMS voice Evolved Packet System (EPS) fallback triggered or Radio Access Technology (RAT) fallback triggered; and The third circuit 1020-3 in the processor of the base station may perform an EPS fallback procedure or an inter-RAT fallback procedure.

The fourth circuit (not shown) in the processor of the base station may not transmit a response message to the PDU session establishment request message.

The base station may be included in a Next Generation Radio Access Network (NG-RAN).

The base station may transmit a message to perform handover or redirection in order to send a UE to an EPS.

The fifth circuit (not shown) in the processor of the base station may perform the handover of the PDU session of a non-3GPP access again in the EPS after an EPS fallback procedure is over, based on the base station starting the EPS fallback procedure in a state in which the UE does not receive a response message to the PDU session establishment request message for moving the PDU session of the non-3GPP access to a 3GPP access.

Figure 22:
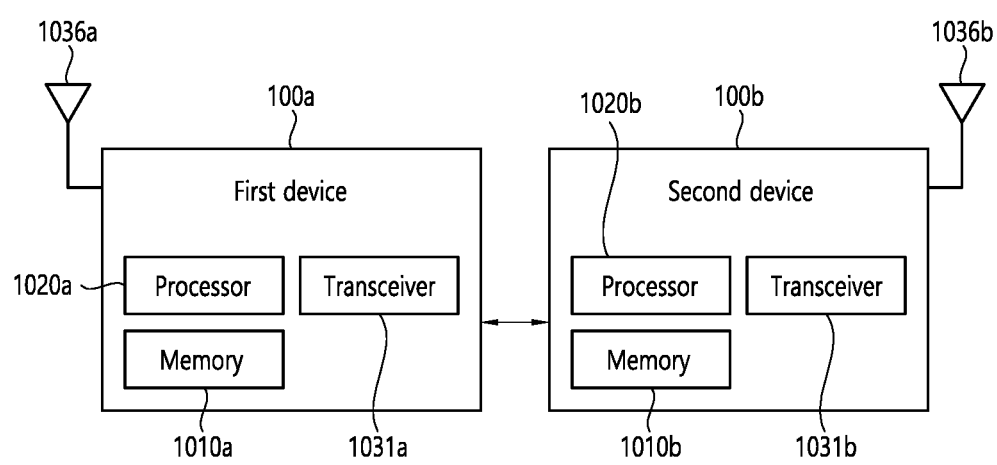
FIG. 22 illustrates a wireless communication system according to an embodiment.

FIG. 22 illustrates a wireless communication system according to an embodiment.

Referring to FIG. 22, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 23:
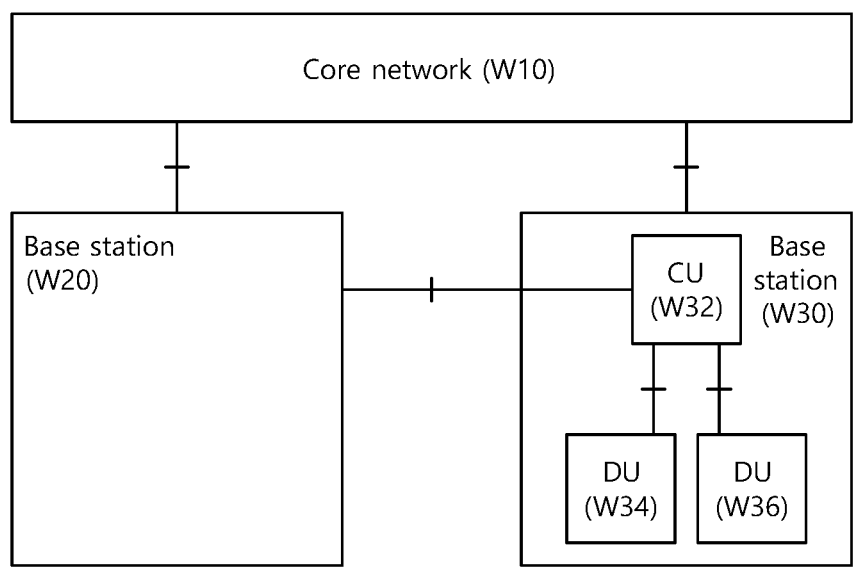
FIG. 23 illustrates a block diagram of a network node according to an embodiment.

FIG. 23 illustrates a block diagram of a network node according to an embodiment.

In particular, FIG. 23 is a diagram illustrating in detail a case in which a base station is divided into a Central Unit (CU) and a Distributed Unit (DU).

Referring to FIG. 23, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 24:
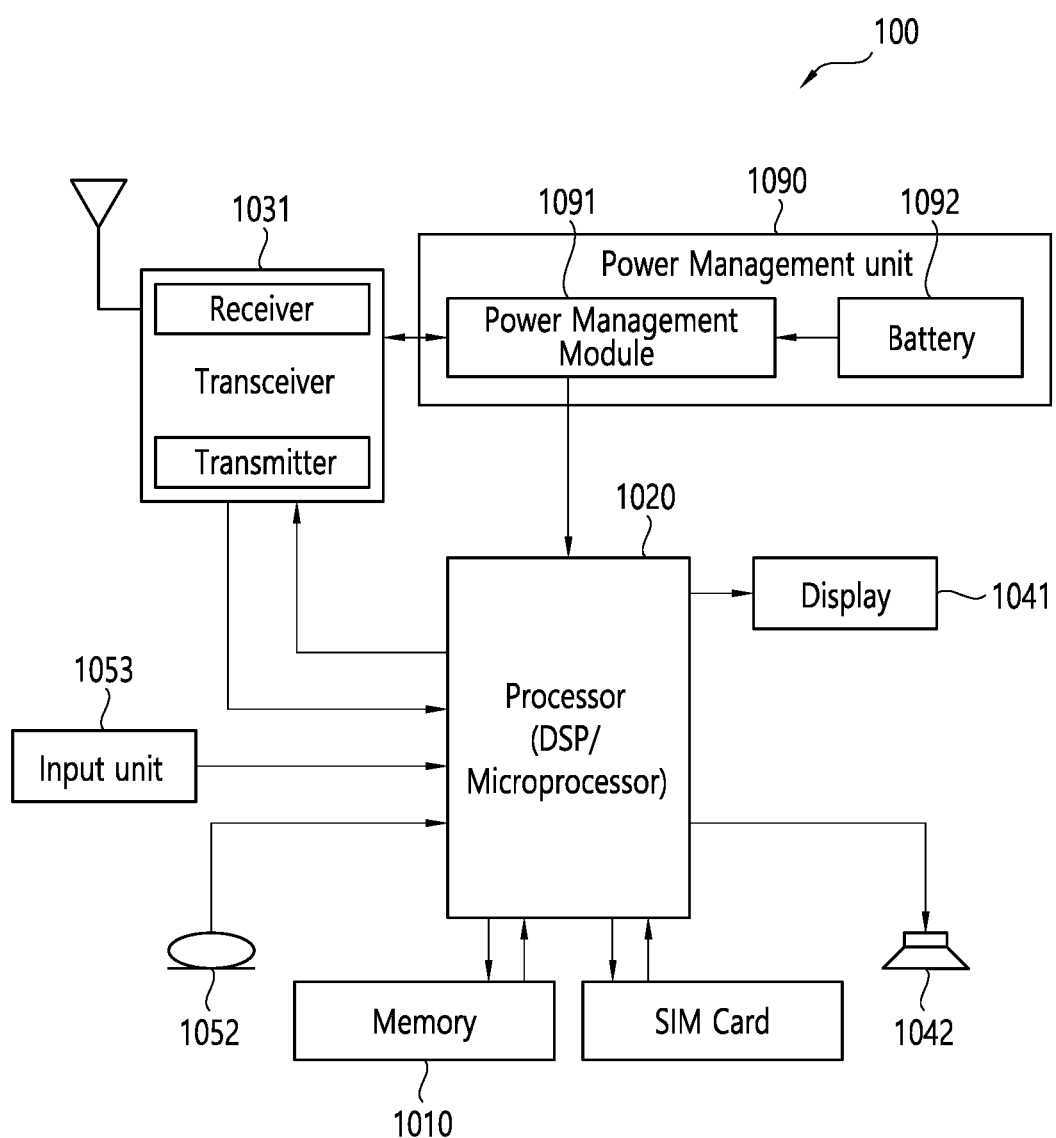
FIG. 24 is a block diagram illustrating a configuration of a UE according to an embodiment.

FIG. 24 is a block diagram illustrating a configuration of a UE according to an embodiment.

In particular, the UE 100 shown in FIG. 24 is a diagram illustrating the first device of FIG. 22 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 25:
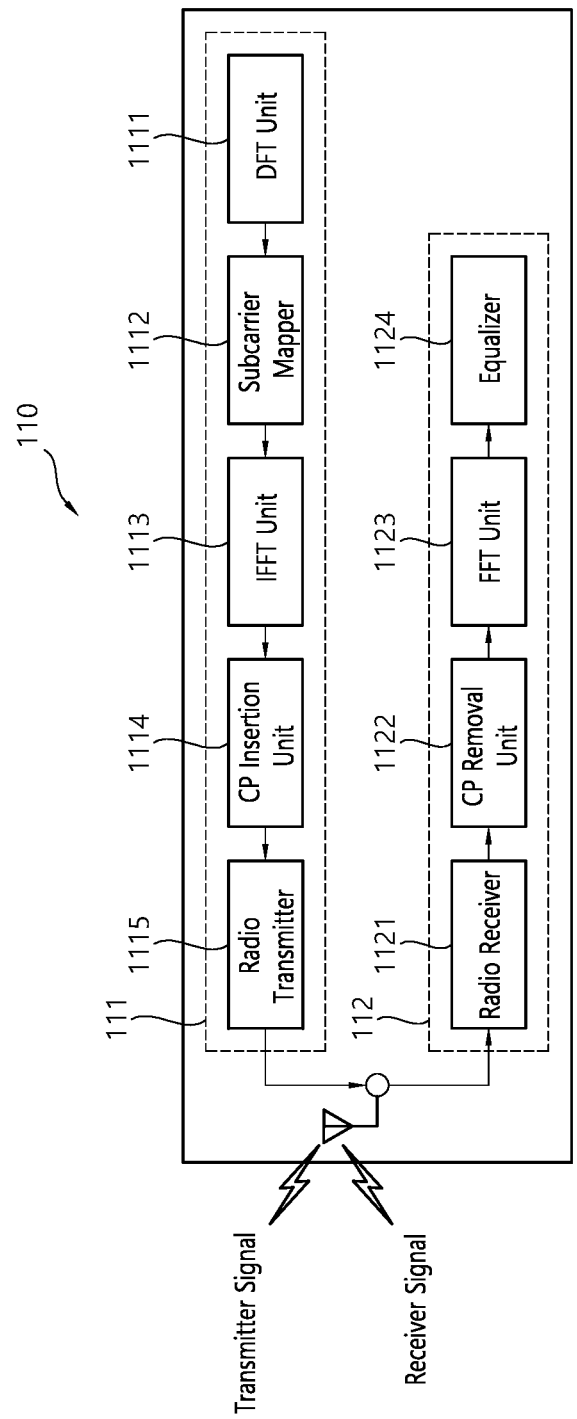
FIG. 25 is a detailed block diagram illustrating the transceiver of the first device shown in FIG. 13 or the transceiver of the device shown in FIG. 22 in detail.

FIG. 25 is a detailed block diagram illustrating the transceiver of the first device shown in FIG. 13 or the transceiver of the device shown in FIG. 22 in detail.

Referring to FIG. 25, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 26:
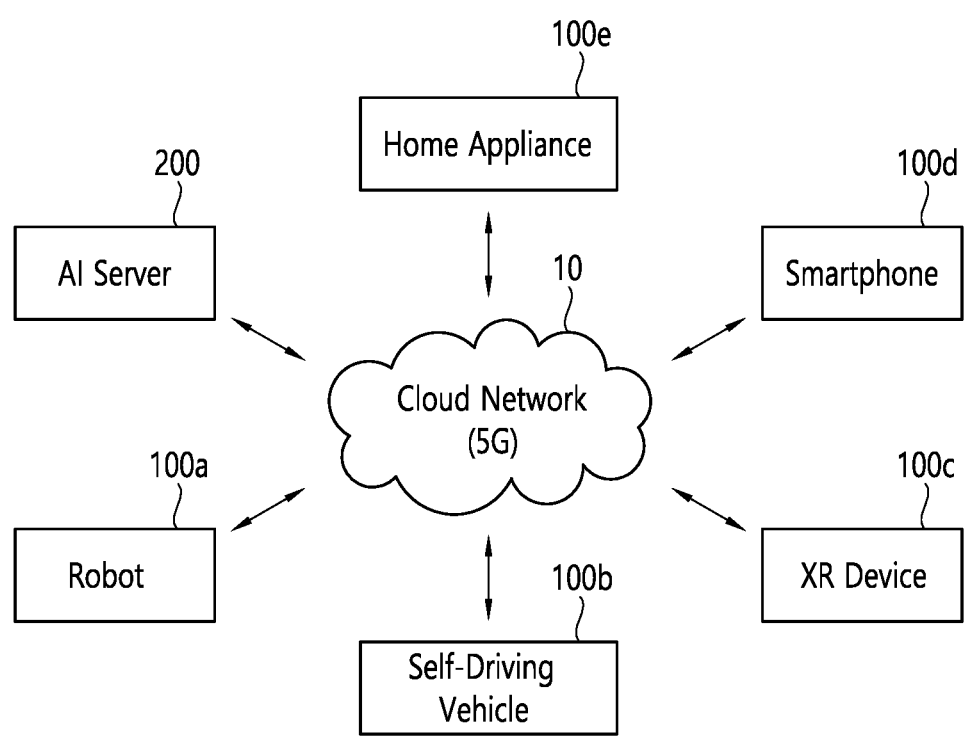
FIG. 26 illustrates a communication system 1 applied to the disclosure of the present specification.

FIG. 26 illustrates a communication system 1 applied to the disclosure of the present specification.

Referring to FIG. 26, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method of a Next Generation Radio Access Network (NG-RAN) for an Internet protocol Multimedia Subsystem (IMS) voice service, the method comprising:

receiving a Non-Access-Stratum (NAS) message including a Protocol Data Unit (PDU) session establishment request for establishment of a PDU session for an IMS voice service via a 3rd Generation Partnership Project (3GPP) access from a User Equipment (UE), wherein the PDU session establishment request indicates an existing PDU session, based on a handover from a non-3GPP access to the 3GPP access for the UE, wherein the UE had the existing PDU session for the IMS voice service via the non-3GPP access before the handover;

transmitting the NAS message including the PDU session establishment request to an Access and Mobility Management Function (AMF);
receiving a PDU session resource setup request for the PDU session for the IMS voice service from the AMF;
determining to trigger an Evolved Packet System (EPS) Fallback, or a radio access technology (RAT) Fallback, for the IMS voice session based on the NG-RAN not supporting the IMS voice service; and
transmitting a rejection of the establishment of the PDU session to the AMF, based on the determination to trigger the EPS Fallback or the RAT Fallback.

2. The method of claim 1, further comprising:
ignoring the PDU session establishment request and not transmitting a response to the PDU session establishment request to the UE.

3. The method of claim 1, further comprising:
transmitting, to the UE, a response to the PDU session establishment request so as to perform a handover of the UE to an EPS after the EPS fallback or the RAT Fallback.

4. The method of claim 1, further comprising:
performing the handover from the non-3GPP access to the 3GPP access for the UE.

5. The method of claim 1, wherein the transmitting the rejection of the establishment of the PDU session is performed during a procedure for the establishment of the PDU session.

6. A Next Generation Radio Access Network (NG-RAN) device comprising:
a transceiver;
at least one processor; and
at least one memory for storing instructions and electrically connected to the at least one processor,
wherein the instructions cause the at least one processor to perform operations comprising:
receiving a NAS (Non-Access-Stratum) message including a Protocol Data Unit (PDU) session establishment request for establishment of a PDU session for an Internet protocol Multimedia Subsystem (IMS) voice service via a 3rd Generation Partnership Project (3GPP) access from a User Equipment (UE),
wherein the PDU session establishment request indicates an existing PDU session, based on a handover from a non-3GPP access to the 3GPP access for the UE,
wherein the UE had the existing PDU session for the IMS voice service via the non-3GPP access before the handover;
transmitting the NAS message including the PDU session establishment request to an Access and Mobility Management Function (AMF);
receiving a PDU session resource setup request for the PDU session for the IMS voice service from the AMF;
determining to trigger an Evolved Packet System (EPS) Fallback, or a radio access technology (RAT) Fallback, for the IMS voice session based on the NG-RAN not supporting the IMS voice service; and
transmitting a rejection of the establishment of the PDU session to the AMF, based on the determination to trigger the EPS Fallback or the RAT Fallback.

7. The NG-RAN of claim 6, wherein the operations further comprise ignoring the PDU establishment request and not transmitting a response to the PDU session establishment request to the UE.

8. The NG-RAN of claim 6, wherein the operations further comprise transmitting, to the UE, a response to the PDU session establishment request so as to perform a handover of the UE to an EPS after the EPS fallback or the RAT Fallback.

9. The NG-RAN of claim 6, wherein the operations further comprise performing the handover from the non-3GPP access to the 3GPP access for the UE.

10. The NG-RAN of claim 6, wherein the transmitting the rejection of the establishment of the PDU session is performed during procedure for the establishment of the PDU session.

* * * * *